(12) United States Patent
Matsumoto et al.

(10) Patent No.: US 11,818,339 B2
(45) Date of Patent: Nov. 14, 2023

(54) IMAGE PROCESSING APPARATUS AND IMAGE PROCESSING METHOD

(71) Applicant: SONY CORPORATION, Tokyo (JP)

(72) Inventors: Junichi Matsumoto, Kanagawa (JP); Atsushi Tsuboi, Kanagawa (JP); Hiromichi Ueno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 506 days.

(21) Appl. No.: 17/251,914

(22) PCT Filed: Apr. 3, 2019

(86) PCT No.: PCT/JP2019/014761
§ 371 (c)(1),
(2) Date: Dec. 14, 2020

(87) PCT Pub. No.: WO2019/244439
PCT Pub. Date: Dec. 26, 2019

(65) Prior Publication Data
US 2021/0168363 A1    Jun. 3, 2021

(30) Foreign Application Priority Data

Jun. 21, 2018  (JP) ................................. 2018-117789

(51) Int. Cl.
*H04N 19/11*  (2014.01)
*H04N 19/119* (2014.01)
(Continued)

(52) U.S. Cl.
CPC ............. *H04N 19/11* (2014.11); *G06T 5/006* (2013.01); *H04N 19/119* (2014.11);
(Continued)

(58) Field of Classification Search
CPC .... H04N 19/11; H04N 19/119; H04N 19/136; H04N 19/167; H04N 19/176;
(Continued)

(56) References Cited

U.S. PATENT DOCUMENTS

2018/0103219 A1    4/2018  Jeong et al.
2019/0007684 A1*   1/2019  Van Der Auwera .........
                                                  H04N 19/172

FOREIGN PATENT DOCUMENTS

JP      2015-050661 A     3/2015
WO    WO 2017/204185 A1  11/2017
(Continued)

OTHER PUBLICATIONS

Joo, Jaehwan "Fast Sample Adaptive Offset Encoding Algorithm for HEVC based on Intra Prediction Mode" IEEE Third International Conference on Consumer Electronics. (Year: 2013).*
(Continued)

*Primary Examiner* — Molly Wilburn
(74) *Attorney, Agent, or Firm* — Paratus Law Group, PLLC

(57) ABSTRACT

In a case where it is identified based on fisheye information that an input image is a fisheye image, a block position computing section computes the position of a processing target block relative to a fisheye center, and outputs, to a table selecting section, positional information representing the computed position. In a case where it is identified based on fisheye information that an input image is a fisheye image, the table selecting section selects, on the basis of positional information, an intra-prediction mode table according to the position of a processing target block from a plurality of intra-prediction mode tables, and outputs the selected intra-prediction mode table to a prediction image generating section. By using the intra-prediction mode table supplied from the table selecting section and the reference (Continued)

image data read out from a frame memory via a selecting section, the prediction image generating section performs direction prediction and generates prediction image data for prediction modes represented in the intra-prediction mode table. An encoding or decoding process on an image on which distortions are generated can be performed efficiently.

18 Claims, 24 Drawing Sheets

(51) Int. Cl.
*H04N 19/136* (2014.01)
*H04N 19/167* (2014.01)
*H04N 19/176* (2014.01)
*H04N 19/593* (2014.01)
*H04N 19/70* (2014.01)
*G06T 5/00* (2006.01)

(52) U.S. Cl.
CPC ......... *H04N 19/136* (2014.11); *H04N 19/167* (2014.11); *H04N 19/176* (2014.11); *H04N 19/593* (2014.11); *H04N 19/70* (2014.11)

(58) Field of Classification Search
CPC ...... H04N 19/593; H04N 19/70; H04N 19/86; G06T 5/006; G06T 2207/10016; G06T 2207/30252

See application file for complete search history.

(56) References Cited

FOREIGN PATENT DOCUMENTS

WO    WO-2018060329 A1    4/2018
WO    WO-2018060346 A1    4/2018

OTHER PUBLICATIONS

Eichenseer et al., Coding of Distortion-Corrected Fisheye Video Sequences Using H.265/HEVC, 2014 IEEE International Conference on Image Processing, Jan. 29, 2015, pp. 4132-4136, IEEE, Paris, France.

Hanhart et al., AHG8: Reference samples derivation using geometry padding for intra coding, Joint Video Exploration Team (JVET) of ITU-T SG 16 WP 3 and ISO/IEC JTC 1/SC 29/WG 11, Oct. 15-21, 2016, pp. 1-6, 4$^{th}$ Meeting: Chengdu, CN.

* cited by examiner

FIG. 5

| PROJECTION METHOD | CORRECTION FACTOR |
|---|---|
| ORTHOGONAL PROJECTION | $1/\cos\alpha$ |
| EQUIDISTANCE PROJECTION | $\tan\alpha/\alpha$ |
| STEREOGRAPHIC PROJECTION | $\tan\alpha/(2\cdot\tan(\alpha/2))$ |
| EQUISOLID ANGLE PROJECTION | $\tan\alpha/(2\cdot\sin(\alpha/2))$ |

FIG. 11
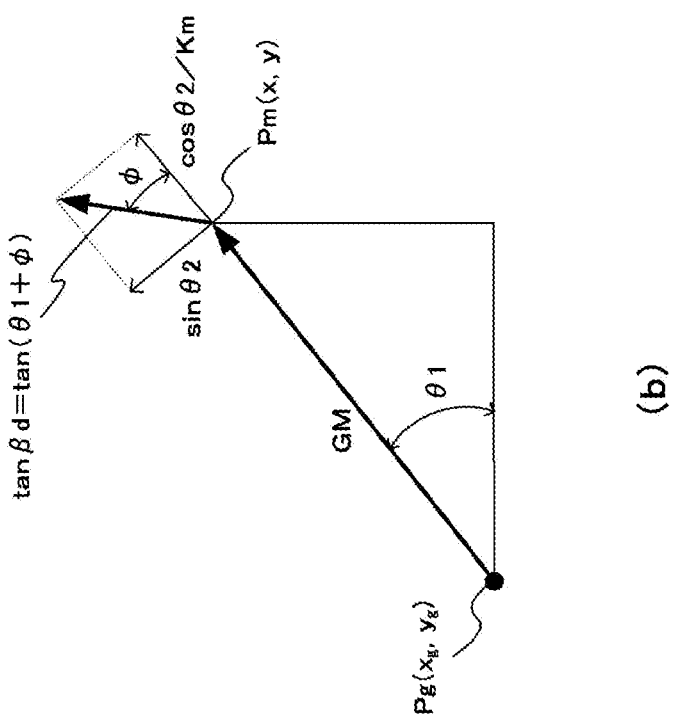
(b)
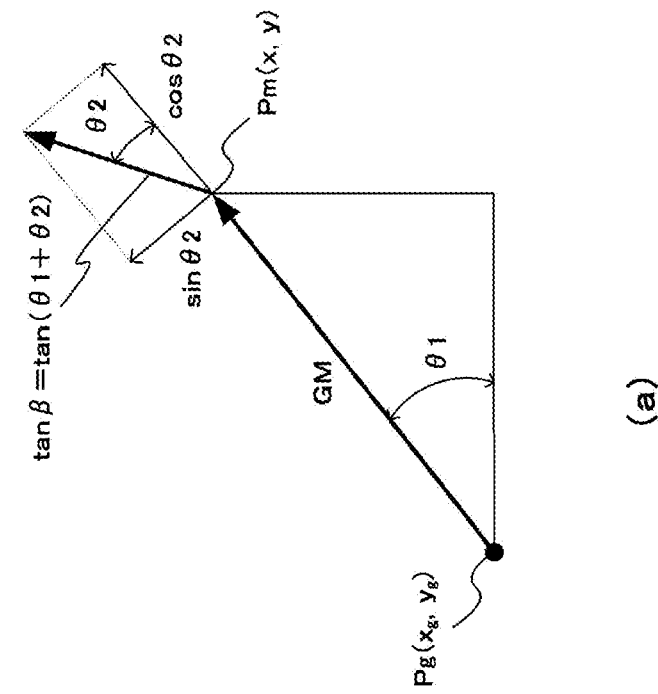
(a)

FIG. 12

| PREDICTION MODE | 2 | 3 | 4 | 5 | 6 | 7 | 8 | 9 | 10 |
|---|---|---|---|---|---|---|---|---|---|
| ANGLE [°] ($\tan\beta_d$) | 225 (1) | 220.03 (0.84) | 214.606 (0.69) | 208.369 (0.54) | 201.801 (0.4) | 194.574 (0.26) | 186.843 (0.12) | 180 (0) | 172.593 (−0.13) |

| PREDICTION MODE | 11 | 12 | 13 | 14 | 15 | 16 | 17 | 18 | 19 |
|---|---|---|---|---|---|---|---|---|---|
| ANGLE [°] ($\tan\beta_d$) | 165.964 (−0.25) | 159.696 (−0.37) | 154.359 (−0.48) | 149.459 (−0.59) | 145.008 (−0.7) | 141.34 (−0.8) | 138.013 (−0.9) | 135 (−1) | 132.016 (−1.11) |

| PREDICTION MODE | 20 | 21 | 22 | 23 | 24 | 25 | 26 | 27 | 28 |
|---|---|---|---|---|---|---|---|---|---|
| ANGLE [°] ($\tan\beta_d$) | 128.66 (−1.25) | 124.965 (−1.43) | 120.613 (−1.69) | 115.677 (−2.08) | 110.254 (−2.71) | 104.104 (−3.98) | 97.428 (−7.67) | 90.317 (−181) | 82.962 (8.1) |

| PREDICTION MODE | 29 | 30 | 31 | 32 | 33 | 34 |
|---|---|---|---|---|---|---|
| ANGLE [°] ($\tan\beta_d$) | 75.583 (3.89) | 68.433 (2.53) | 61.736 (1.86) | 55.592 (1.46) | 49.958 (1.19) | 45 (1) |

FIG.13
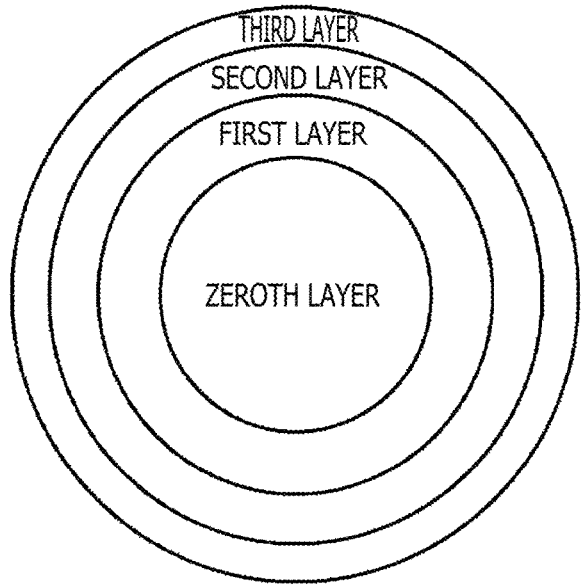
(a)
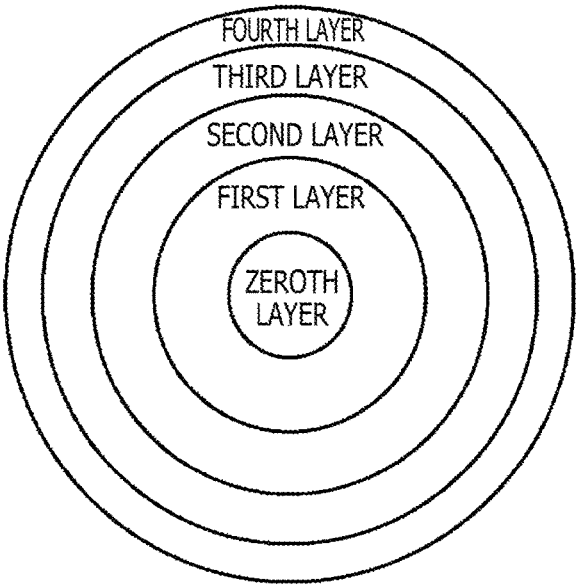
(b)
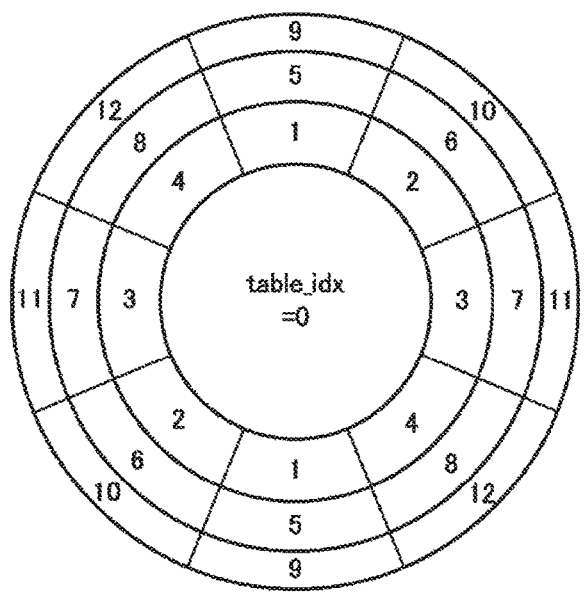
(c)
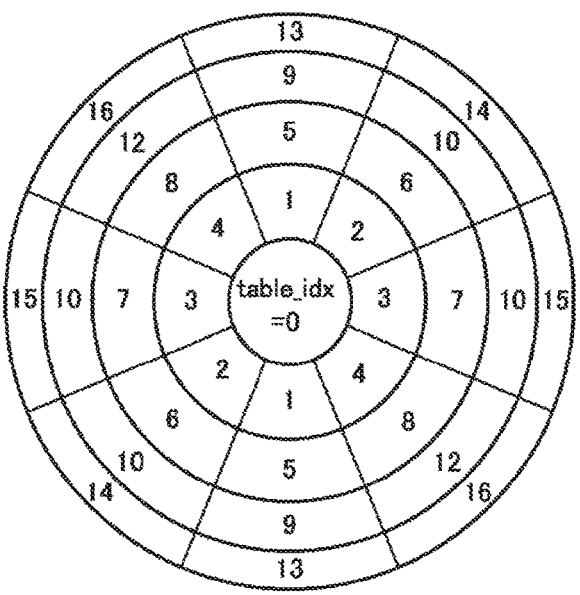
(d)

FIG. 16

| | ZEROTH LAYER | FIRST LAYER | SECOND LAYER | THIRD LAYER |
|---|---|---|---|---|
| CORRECTION FACTOR | 1.0 | 1.1 | 1.2 | 1.3 |
| INTERVAL RATIO | 0.4 | 0.3 | 0.2 | 0.1 |

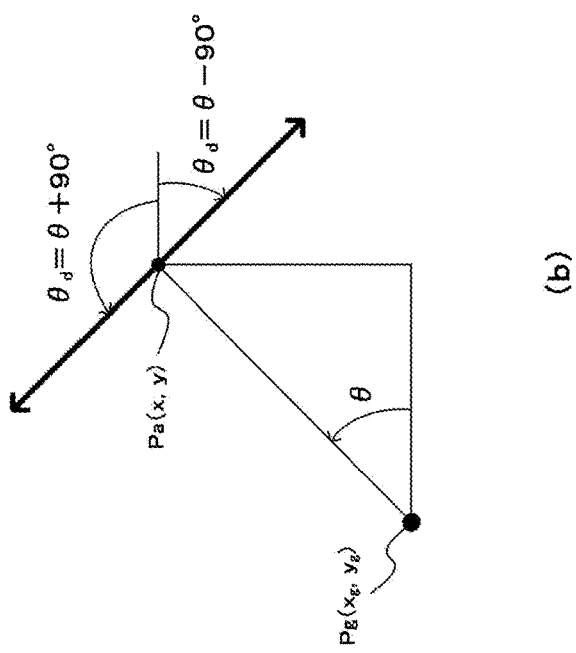
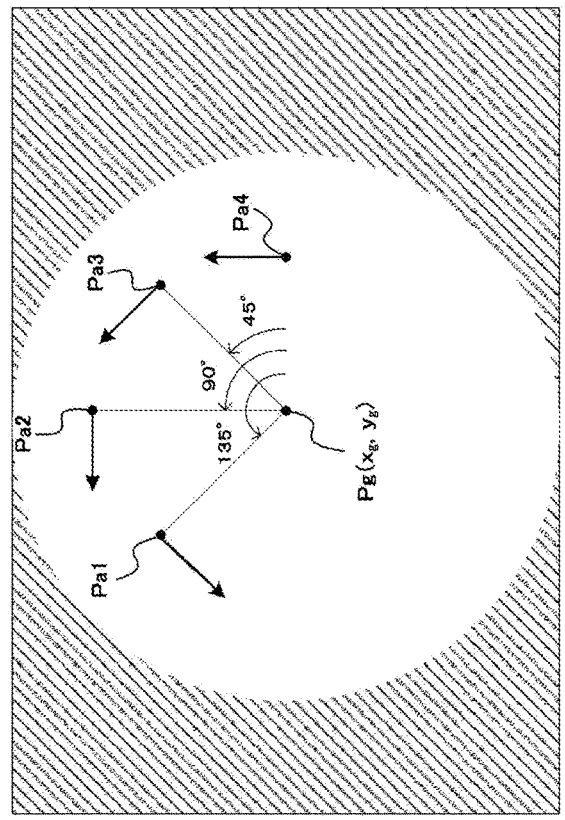
FIG. 20

FIG. 22
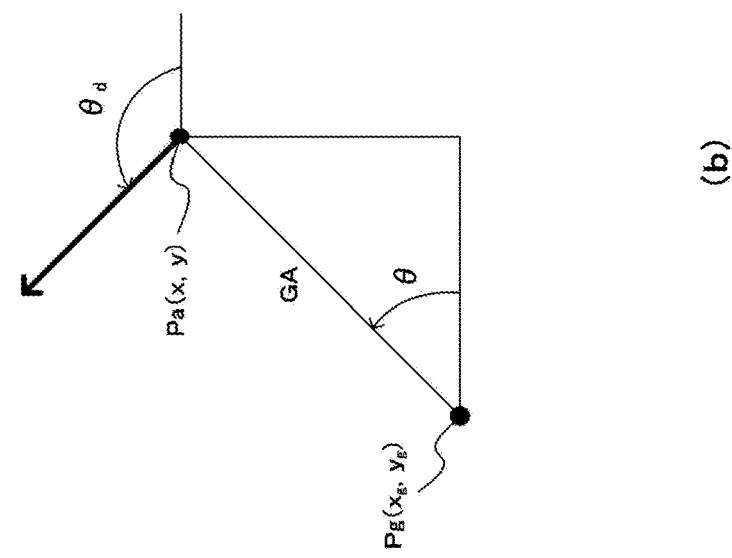
(b)
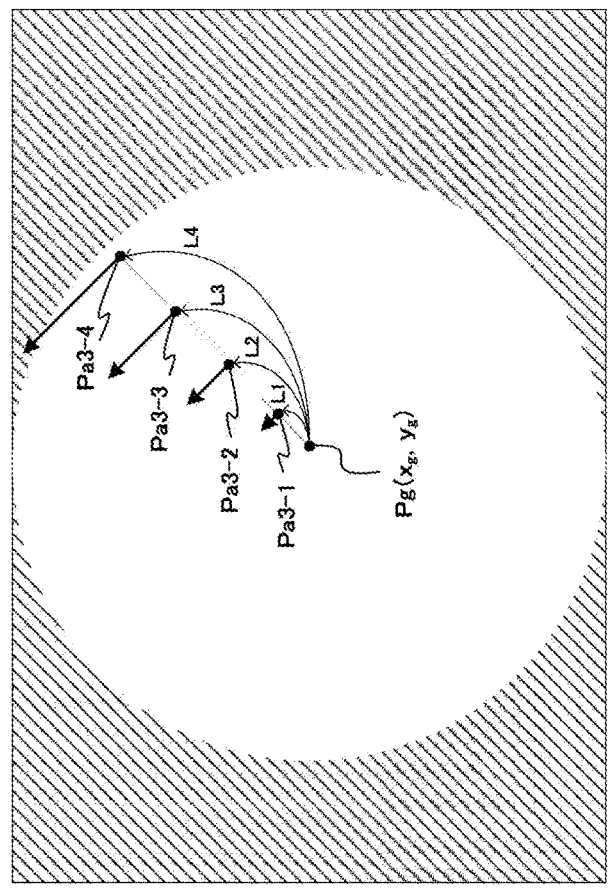
(a)

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2019/014761 (filed on Apr. 3, 2019) under 35 U.S.C. § 371, which claims priority to Japanese Patent Application No. 2018-117789 (filed on Jun. 21, 2018), which are all hereby incorporated by reference in their entirety.

TECHNICAL FIELD

This technique relates to an image processing apparatus and an image processing method.

BACKGROUND ART

An encoding/decoding process on a fisheye image obtained by performing image-capturing by use of a fisheye lens can be performed similarly to an encoding/decoding process for an image (normal image) obtained by performing image-capturing by use of a standard lens or the like with an angle of view narrower than that of the fisheye lens. However, a fisheye image has fisheye distortion occurring when, specifically, an object that is located farther from the center is distorted more toward the center. Because of this, in PTL 1, characteristics of an image are decided according to characteristics of a lens, a block size is decided on the basis of characteristics of an image in a first block that is generated by division in a predetermined first size, the first block is divided further in the decided block size, and predictive encoding is performed for each block, thereby attempting to improve the encoding efficiency.

CITATION LIST

Patent Literature

[PTL 1]
JP 2015-050661A

SUMMARY

Technical Problem

Meanwhile, in PTL 1, the predictive encoding on the blocks that are generated by the division in the block size based on the characteristics of the image is performed without taking into consideration the characteristics of the image decided according to the characteristics of the lens. Because of this, there is a risk that the predictive encoding of the divided blocks cannot be performed efficiently.

In view of this, an object of this technique is to provide an image processing apparatus and an image processing method that make it possible to perform an encoding or decoding process efficiently on an image on which distortions are generated.

Solution to Problem

According to a first aspect of this technique, an image processing apparatus includes an intra-prediction section that performs intra-prediction by using an intra-prediction mode table according to a position of a processing target block in a fisheye image captured by use of a fisheye lens thereby to generate a prediction image.

In this technique, an intra-prediction mode table according to a position of a processing target block in a fisheye image captured by use of a fisheye lens is used. The intra-prediction mode table according to the position of the processing target block may include a table in which a predetermined plurality of prediction directions is varied according to the position of the processing target block relative to a fisheye center of the fisheye image or may include a table in which the prediction directions are varied on the basis of a correction factor for correcting a fisheye distortion generated at the position of the processing target block. In addition, the intra-prediction mode table according to the position of the processing target block may include a table that represents a prediction direction selected from a predetermined plurality of prediction directions according to the position of the processing target block relative to a fisheye center of the fisheye image, may include a table that represents a prediction direction selected from the predetermined plurality of prediction directions while a circumferential direction orthogonal to a direction of the processing target block relative to the fisheye center is set as a direction of high density or may include a table that represents a prediction direction selected from the predetermined plurality of prediction directions while a degree of density is increased as a distance from the fisheye center to the processing target block increases.

The intra-prediction section performs intra-prediction by using an intra-prediction mode table according to a position of a processing target block, and generates a prediction image. In addition, the intra-prediction section may into a plurality of areas in a radial direction and a circumferential direction by using a fisheye center of the fisheye image as a reference point, the intra-prediction mode table is provided for each area, and the intra-prediction section may perform intra-prediction by using an intra-prediction mode table corresponding to an area including the processing target block. Regarding the split areas, the same intra-prediction mode table is provided for areas that are point-symmetric with respect to the fisheye center as a target point. In addition, an intra-prediction mode table of an area including the fisheye center includes a table that represents a predetermined plurality of prediction directions. In addition, the number of split areas in the radial direction or area split intervals in the radial direction is/are set according to lens characteristics of the fisheye lens.

In addition, a lossless encoding section that includes fisheye information in an encoded stream of an input image in a case where the input image is a fisheye image is further included. The fisheye information includes information representing at least that the input image is a fisheye image and where a fisheye center of the fisheye image is. In addition, the fisheye information may include information regarding the fisheye lens used for acquisition of the fisheye image.

In addition, a lossless decoding section that decodes an encoded stream of the fisheye image is further included, the lossless decoding section parses fisheye information and an optimum intra-prediction mode included in the encoded stream, and the intra-prediction section generates a prediction image by using an intra-prediction mode table according to the position of the processing target block on the basis of the fisheye information and the optimum intra-prediction mode obtained by the lossless decoding section. In addition, the fisheye information includes information representing at least that the input image is a fisheye image and where a fisheye center of the fisheye image is, and the intra-prediction section uses an intra-prediction mode table according to the position of the processing target block relative to the fisheye center of the fisheye image. In addition, the fisheye information includes information regarding the fisheye lens used for acquisition of the fisheye image, and the intra-prediction section uses an intra-prediction mode table according to the information regarding the fisheye lens and the position of the processing target block.

According to a second aspect of this technique, an image processing method includes performing intra-prediction by using an intra-prediction mode table according to a position of a processing target block in a fisheye image captured by use of a fisheye lens, thereby generating a prediction image by an intra-prediction section.

Advantageous Effects of Invention

According to this technique, intra-prediction is performed by use of an intra-prediction mode table according to the position of a processing target block in a fisheye image captured with a fisheye lens, and a prediction image is generated. Accordingly, an encoding or decoding process on an image on which distortions are generated can be performed efficiently. Note that advantages described in the present specification are illustrated merely as examples and that the advantages of the present technique are not limited to them. There may be additional advantages.

BRIEF DESCRIPTION OF DRAWINGS

FIG. 5 is a view illustrating, for each projection method, the correction factor for correcting a fisheye image to a normal image.

FIG. 11 depicts views for explaining prediction directions of intra-prediction.

FIG. 12 is a view illustrating a relation between prediction modes and inclinations (in a case where $\theta1=\pi/4$, $Km=1.3$) of an intra-prediction mode table (distortion table) used for a fisheye image.

FIG. 13 depicts views for explaining an area split of a fisheye image.

FIG. 16 is a view illustrating an example of a relation between correction factors and interval ratios in each layer in a case where the number of layers=4.

FIG. 20 depicts views illustrating an example of an operation in a case where a selection table is generated on the basis of orientations of processing target blocks relative to a fisheye center.

FIG. 22 depicts views illustrating an example of an operation in a case where a selection table is generated on the basis of orientations of processing target blocks relative to the fisheye center, and distances from the fisheye center.

DESCRIPTION OF EMBODIMENTS

Figure 1:
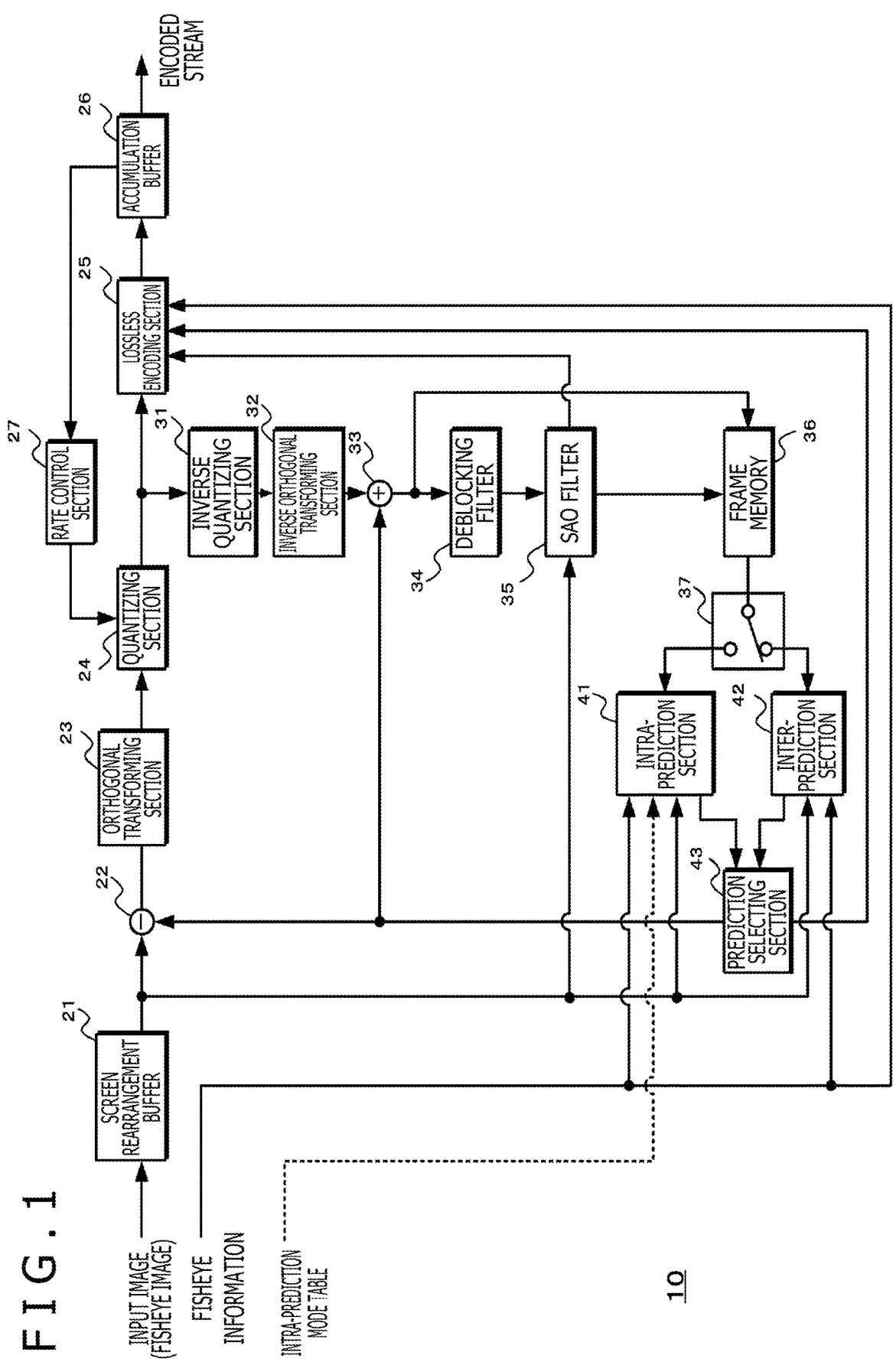
FIG. 1 is a view illustrating an example of a configuration of an image encoding apparatus.

In the following, modes for carrying out the present technique will be described. The scope disclosed in the present application includes not only contents described in the present specification and the drawings, but also contents described in the following documents that had been known at the time of the filing of the present application.

Document 1: AVC standards ("Advanced video coding for generic audiovisual services," ITU-T H. 264 (April 2017))

Document 2: HEVC standards ("High efficiency video coding," ITU-T H. 265 (December 2016))

Document 3: FVC algorithm description (Algorithm description of Joint Exploration Test Model 7 (JEM7), 2017 Aug. 2019)

That is, the contents described in the documents mentioned above also serve as grounds for making determinations on the support requirements. For example, Quad-Tree Block Structure described in Document 1, and QTBT (Quad Tree Plus Binary Tree) and Block Structure described in Document 3 are within the scope of disclosure of the present technique even if there are no direct descriptions in embodiments and are deemed to satisfy the support requirements of claims. In addition, for example, technical terms such as parsing, syntax, or semantics are similarly within the scope of disclosure of the present technique even if there are no direct descriptions in embodiments and are deemed to satisfy the support requirements of claims.

In addition, "blocks" (not blocks representing processing sections) used for explaining partial areas and processing units of an image (picture) in the present specification represent any partial areas within the picture unless mentioned otherwise particularly, and their sizes, shapes, characteristics, and the like are not limited. For example, the "blocks" include any partial areas (processing units) such as TB (Transform Block), TU (Transform Unit), PB (Prediction Block), PU (Prediction Unit), SCU (Smallest Coding Unit), CU (Coding Unit), LCU (Largest Coding Unit), CTB (Coding Tree Block), CTU (Coding Tree Unit), transform block, sub-block, macro-block, tile, slice, or the like described in Documents 1 to 3 mentioned above.

In addition, in designating sizes of such blocks, block sizes may not only be designated directly, but block sizes may also be designated indirectly. For example, block sizes may be designated by using identification information identifying sizes. In addition, for example, block sizes may be designated by ratios with or differences from sizes of blocks (e.g. LCUs, SCUs, etc.) that serve as reference block sizes. For example, in a case where information designating block sizes as syntax elements or the like is transmitted, information indirectly designating sizes mentioned above may be used as the information. By doing so, the information amount of the information can be reduced, and the encoding efficiency can be improved in some cases. In addition, the designation of block sizes also includes designation of ranges of block sizes (e.g. designation of tolerated ranges of block sizes, etc.).

In the following, the present technique is described in the following order:
1. Regarding Image Processing Apparatus
2. First Embodiment
   2-1. Configuration of Image Encoding Apparatus
   2-2. Operation by Image Encoding Apparatus
       2-2-1. Regarding Intra-Prediction Table
       2-2-2. Regarding Encoding Process Operation
   2-3. Configuration of Image Decoding Apparatus
   2-4. Operation by Image Decoding Apparatus
3. Second Embodiment
   3-1. Configuration of Image Encoding Apparatus
   3-2. Operation by Image Encoding Apparatus
       3-2-1. Regarding Intra-Prediction Table
       3-2-2. Regarding Encoding Process Operation
4. Application Examples 1. Regarding Image Processing Apparatus An image processing apparatus performs an encoding process on a moving image (hereinafter, also referred to as a "fisheye image") acquired by performing image-capturing by use of a fisheye lens, or a decoding process on an encoded stream generated by the encoding process. In addition, the image processing apparatus is also configured to be able to perform an encoding process on a moving image (hereinafter, also referred to as a "normal image") acquired by performing image-capturing by use of a lens that does not generate fisheye distortions (hereinafter, also referred to as a "normal lens"), or a decoding process on an encoded stream generated by the encoding process.

2. First Embodiment

In a first embodiment, the encoding efficiency of intra-prediction is improved by switching intra-prediction tables according to lens distortion characteristics.

<2-1. Configuration of Image Encoding Apparatus>

FIG. 1 illustrates an example of the configuration of an image encoding apparatus that performs an encoding process on a fisheye image. An image encoding apparatus 10 performs encoding of image data by using a prediction process, and generates an encoded stream complying with the H. 265/HEVC standards, for example.

The image encoding apparatus 10 has a screen rearrangement buffer 21, a calculating section 22, an orthogonal transforming section 23, a quantizing section 24, a lossless encoding section 25, an accumulation buffer 26, and a rate control section 27. In addition, the image encoding apparatus 10 has an inverse quantizing section 31, an inverse orthogonal transforming section 32, a calculating section 33, a deblocking filter 34, an SAO (Sample Adaptive Offset) filter 35, a frame memory 36 and a selecting section 37. Further, the image encoding apparatus 10 has an intra-prediction section 41, an inter-prediction section 42, and a prediction selecting section 43.

The fisheye image is input to the screen rearrangement buffer 21 as an input image. In addition, fisheye information regarding the fisheye image is input to the intra-prediction section 41, the inter-prediction section 42, and the lossless encoding section 25. The fisheye information includes at least information representing that the input image is a fisheye image and information representing where the fisheye center of the fisheye image is. For example, flag information representing that the input image is a fisheye image, and information representing the position of the fisheye center in the two-dimensional image, the radius of the fisheye image, and the like are included. In addition, the fisheye information may also include information regarding a lens used for acquisition of the fisheye image (e.g. a projection method, the name of the lens, etc.). The information regarding the lens used for the acquisition of the fisheye image may be used as the information representing that the input image is a fisheye image.

The screen rearrangement buffer 21 stores the input image, and rearranges stored frame images, which are arranged in the order of display, in an order for encoding (order of encoding) according to a GOP (Group of Picture) structure. The screen rearrangement buffer 21 outputs, to the calculating section 22, image data (original image data) of the frame images rearranged in the order of encoding. In addition, the screen rearrangement buffer 21 outputs the original image data to the SAO filter 35, the intra-prediction section 41, and the inter-prediction section 42.

From the original image data supplied from the screen rearrangement buffer 21, the calculating section 22 subtracts, for each pixel, prediction image data supplied from the intra-prediction section 41 or the inter-prediction section 42 via the prediction selecting section 43, and outputs residual data representing prediction residues to the orthogonal transforming section 23.

For example, in the case of an image on which intra-encoding is performed, the calculating section 22 subtracts, from the original image data, the prediction image data generated by the intra-prediction section 41. In addition, for example, in the case of an image on which inter-encoding is performed, the calculating section 22 subtracts, from the original image data, the prediction image data generated by the inter-prediction section 42.

The orthogonal transforming section 23 performs an orthogonal transform process on the residual data supplied from the calculating section 22. For example, for each of one or more TUs set in each CTU (Coding Tree Unit), the orthogonal transforming section 23 performs an orthogonal transform such as the discrete cosine transform, the discrete sine transform, or the Karhunen-Loève transform. The orthogonal transforming section 23 outputs, to the quantizing section 24, a transform coefficient in a frequency domain obtained by performing the orthogonal transform process.

The quantizing section 24 quantizes the transform coefficient output by the orthogonal transforming section 23. The quantizing section 24 outputs the quantized data of the transform coefficient to the lossless encoding section 25. In addition, the quantizing section 24 outputs the generated quantized data also to the inverse quantizing section 31.

For each CTU, the lossless encoding section 25 performs a lossless encoding process on the quantized data input from the quantizing section 24, for example, a lossless encoding process of CABAC (Context-Adaptive Binary Arithmetic Coding). In addition, the lossless encoding section 25 acquires information regarding a prediction mode selected by the prediction selecting section 43, for example, intra-prediction information, inter-prediction information, or the like. Further, from the SAO filter 35 mentioned below, the lossless encoding section 25 acquires filter information regarding a filtering process. Furthermore, the lossless encoding section 25 acquires block information representing how CTUs, CUs, TUs, and PUs should be set for the image. In addition to the encoding of the quantized data, the lossless encoding section 25 causes the acquired parameter information regarding the encoding process as syntax elements of the H. 265/HEVC standards to be accumulated in the accumulation buffer 26 as part of header information of the encoded stream. In addition, as syntax elements of the encoded stream or as SEI (Supplemental Enhancement Information) which is additional information, the lossless encoding section 25 includes, in the encoded stream, the fisheye information input to the image encoding apparatus 10.

The accumulation buffer 26 temporarily retains the data supplied from the lossless encoding section 25, and, as an encoded image that has been encoded, outputs the data as the encoded stream to, for example, an unillustrated recording apparatus, transmission path, or the like which are on the downstream side at a predetermined timing.

On the basis of compressed images accumulated in the accumulation buffer 26, the rate control section 27 controls the rate of the quantization operation by the quantizing section 24 such that an overflow or an underflow does not occur.

The inverse quantizing section 31 performs inverse quantization on the quantized data of the transform coefficient supplied from the quantizing section 24, by a method corresponding to the quantization performed at the quantizing section 24. The inverse quantizing section 31 outputs the obtained inverse-quantized data to the inverse orthogonal transforming section 32.

The inverse orthogonal transforming section 32 performs an inverse orthogonal transform on the supplied inverse-quantized data by a method corresponding to the orthogonal transform process performed at the orthogonal transforming section 23. The inverse orthogonal transforming section 32 outputs, to the calculating section 33, a result of the inverse orthogonal transform, that is, the restored residual data.

To the residual data supplied from the inverse orthogonal transforming section 32, the calculating section 33 adds the prediction image data supplied from the intra-prediction section 41 or the inter-prediction section 42 via the prediction selecting section 43, and obtains a locally decoded image (decoded image). For example, in a case where the residual data corresponds to an image on which intra-encoding is performed, the calculating section 33 adds, to the residual data, the prediction image data supplied from the intra-prediction section 41. In addition, for example, in a case where the residual data corresponds to an image on which inter-encoding is performed, the calculating section 33 adds, to the residual data, the prediction image data supplied from the inter-prediction section 42. Decoded image data, which is a result of the addition, is output to the deblocking filter 34. In addition, the decoded image data is output to the frame memory 36 as reference image data.

The deblocking filter 34 eliminates block distortions in the decoded image data by performing a deblocking filtering process as appropriate. The deblocking filter 34 outputs a result of the filtering process to the SAO filter 35.

The SAO filter 35 performs an adaptive offset filtering process (also referred to as an SAO (Sample Adaptive Offset) process) on the decoded image data having been subjected to the filtering by the deblocking filter 34. The SAO filter 35 outputs the image after the SAO process to the frame memory 36.

Reference image data accumulated in the frame memory 36 is output to the intra-prediction section 41 or the inter-prediction section 42 via the selecting section 37 at a predetermined timing. For example, in the case of an image on which intra-encoding is performed, reference image data on which a filtering process has not been performed by the deblocking filter 34 or the like is read out from the frame memory 36, and is output to the intra-prediction section 41 via the selecting section 37. In addition, for example, in a case where inter-encoding is performed, reference image data on which a filtering process has been performed by the deblocking filter 34 or the like is read out from the frame memory 36, and is output to the inter-prediction section 42 via the selecting section 37.

In a case where an input image is a fisheye image captured by use of a fisheye lens, the intra-prediction section 41 performs intra-prediction by using an intra-prediction mode table according to the position of a processing target block in the fisheye image. It is supposed that the position of the processing target block is the position of an upper left pixel in the processing target block. In addition, in a case where an input image is a normal image, intra-prediction is performed by using a predetermined intra-prediction mode table.

Figure 2:
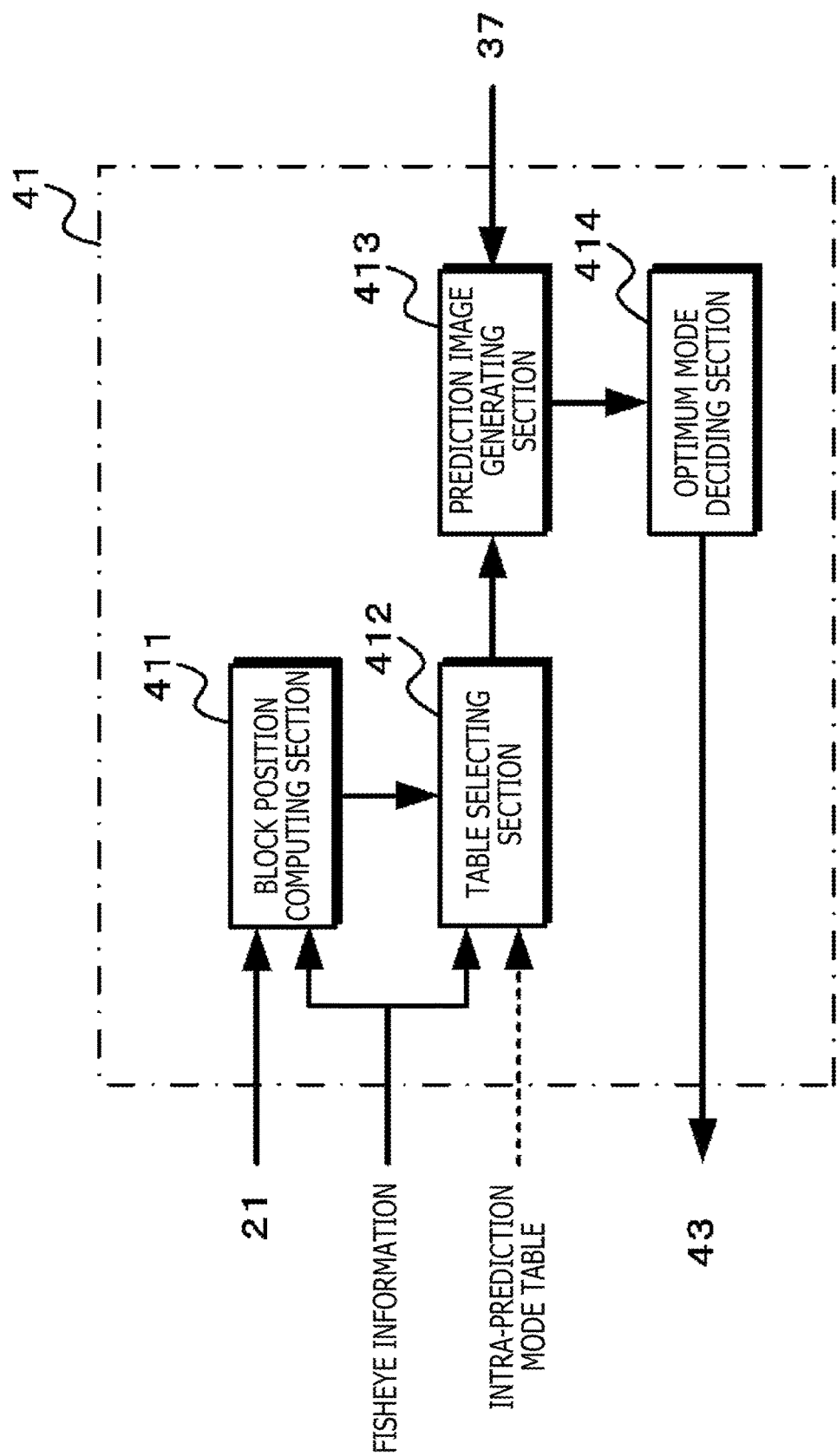
FIG. 2 is a view illustrating an example of a configuration of an intra-prediction section.

FIG. 2 illustrates an example of a configuration of the intra-prediction section 41. The intra-prediction section 41 has a block position computing section 411, a table selecting section 412, a prediction image generating section 413 and an optimum mode deciding section 414.

In a case where it is identified on the basis of fisheye information that an input image is a fisheye image, the block position computing section 411 computes the position of a processing target block relative to a fisheye center (the position of the upper left pixel in the processing target block), and outputs, to the table selecting section 412, positional information representing the computed position.

In a case where it is identified on the basis of fisheye information that an input image is a fisheye image, the table selecting section 412 selects, on the basis of positional information, an intra-prediction mode table according to the position of a processing target block from a plurality of intra-prediction mode tables that are supplied from the outside or prestored therein, and outputs the selected intra-prediction mode table to the prediction image generating section 413. In addition, in a case where an intra-prediction mode table is provided for each type of lens characteristics (e.g. a projection method) of a fisheye lens, the table selecting section 412 selects an intra-prediction mode table according to the lens characteristics represented in fisheye information and the position of a processing target block, and outputs the selected intra-prediction mode table to the prediction image generating section 413. In addition, in a case where an input image is a normal image, the table selecting section 412 outputs, to the prediction image generating section 413, an intra-prediction mode table (hereinafter, also referred to as a "basic table") in which a predetermined plurality of prediction directions are set as prediction modes of direction prediction.

By using the intra-prediction mode table supplied from the table selecting section 412 and the reference image data read out from the frame memory 36 via the selecting section 37, the prediction image generating section 413 performs direction prediction, and generates prediction image data for all the prediction modes represented in the intra-prediction mode table. In addition, the prediction image generating section 413 performs, for each prediction block size, generation of prediction image data for each prediction mode by setting a processing target block to a prediction block size. The prediction image generating section 413 outputs the generated prediction image data to the optimum mode deciding section 414.

The optimum mode deciding section 414 computes a cost function value by using the original image data supplied from the screen rearrangement buffer 21 and prediction image data for each prediction block size and for each prediction mode. Further, while deciding a combination of an intra-prediction mode and a prediction block size that minimizes the cost function value, that is, that maximizes a compression rate, as an optimum intra-prediction mode and an optimum prediction block size, the optimum mode deciding section 414 generates intra-prediction information representing the optimum intra-prediction mode and the like. The optimum mode deciding section 414 outputs, to the prediction selecting section 43, the prediction image data and the cost function value which are generated in the optimum intra-prediction mode and the optimum prediction block size, and the intra-prediction information.

Returning to FIG. 1, on the basis of the original image data and the decoded image data, the inter-prediction section 42 executes an inter-prediction process (motion sensing and motion compensation) on each of one or more PUs set in each CTU. For example, for each of prediction mode candidates included in a search range that is defined, for example, in the specifications of the HEVC, the inter-prediction section 42 evaluates a cost function value based on a prediction error and an encoding amount to be generated. In addition, in a case where it is identified on the basis of fisheye information that an input image is a fisheye image different from a normal image, the inter-prediction section performs, for example, a scaling process on motion vectors of peripheral blocks that are adjacent to a current prediction block according to the fisheye image. The inter-prediction section 42 generates predicted motion vectors by using the motion vectors of the peripheral blocks having been subjected to the scaling process. In addition, the inter-prediction section 42 generates difference vectors between a motion vector and a predicted motion vector of the current prediction block, and uses the difference vector for a computation of a cost function value. Next, the inter-prediction section 42 selects, as an optimum inter-prediction mode, a prediction mode that minimizes the cost function value, that is, a prediction mode that maximizes the compression rate. In addition, the inter-prediction section 42 generates inter-prediction information including motion information representing the difference vector that minimizes the cost function value, and the predicted motion vector, and the like. The inter-prediction section 2 outputs, to the prediction selecting section 43, the prediction image data and the cost function value which are generated in the optimum inter-prediction mode and the optimum prediction block, and the inter-prediction information.

On the basis of a comparison between the cost function values input from the intra-prediction section 41 and the inter-prediction section 42, the prediction selecting section 43 sets a prediction mode for each CTU, CU, or the like. Regarding blocks for which an intra-prediction mode is set, the prediction selecting section 43 outputs, to the calculating sections 22 and 33, prediction image data generated by the intra-prediction section 41, and outputs the intra-prediction information to the lossless encoding section 25. In addition, regarding blocks for which an inter-prediction mode is set, the prediction selecting section 43 outputs, to the calculating sections 22 and 33, prediction image data generated by the inter-prediction section 42, and outputs the inter-prediction information to the lossless encoding section 25.

<2-2. Operation by Image Encoding Apparatus>
<2-2-1. Regarding Intra-Prediction Table>

Figure 3:
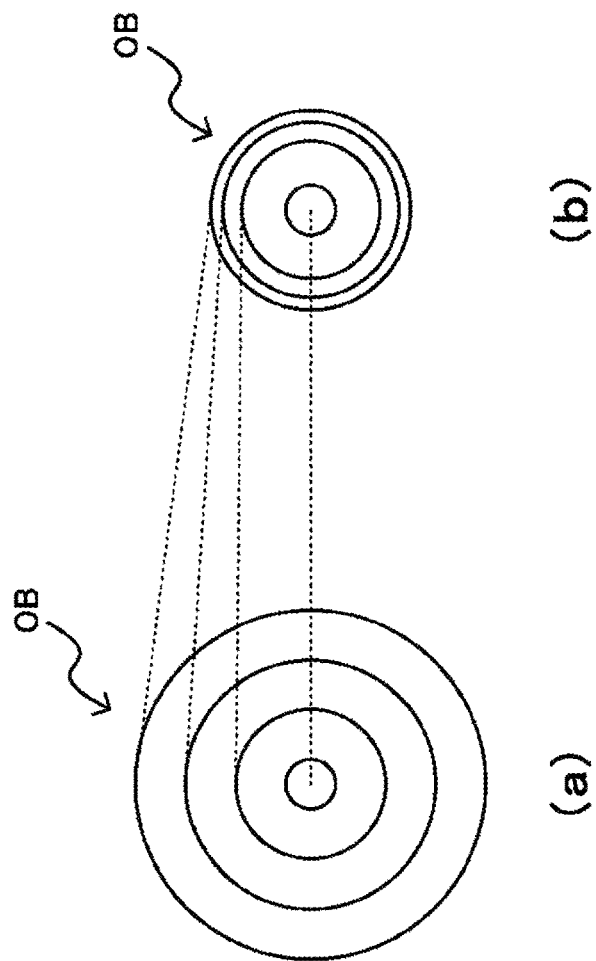
FIG. 3 depicts views for explaining a difference between distortions of a fisheye image and a normal image.

Next, an intra-prediction table to be used at the intra-prediction section 41 is described. FIG. 3 depicts views for explaining differences between distortions of a fisheye image and a normal image. A subject OB is concentric circles whose radii are different from one another at constant intervals, for example, and images of the subject OB are captured by use of a normal lens and a fisheye lens, setting the center of the concentric circles to the middle positions of the images. Subfigure (a) in FIG. 3 illustrates a normal image acquired by use of the normal lens, and Subfigure (b) in FIG. 3 illustrates a fisheye image acquired by use of the fisheye lens.

The concentric circles of the subject OB in the normal image represent the radii that are different from one another at constant intervals. However, the fisheye image has a feature that distortions toward the center increase as the distance from the center increases, and the intervals between the radii of the concentric circles of the subject OB decrease as the distance from the center increases. In addition, because the distortions are generated only toward the center, the shapes remain perfect circles in a case where the center of the circles coincides with the center of the lens. Such a feature of fisheye lenses holds true for fisheye lenses adopting any type of projection method. Accordingly, it becomes possible to correct the fisheye image to a normal image on the basis of the degrees of the distortions. Here, if a correction factor for correcting a fisheye distortion that varies according to the distance from the center of the fisheye lens is "K," the correction factor K has features represented by Formula (1) and Formula (2). Note that Formula (1) represents that the correction factor K is a function of the distance r from the fisheye center and that Formula (2) represents that, if a fisheye image is transformed into a normal image, patterns are expanded.

$$K=F(r) \qquad (1)$$

$$K>1 \qquad (2)$$

Figure 4:
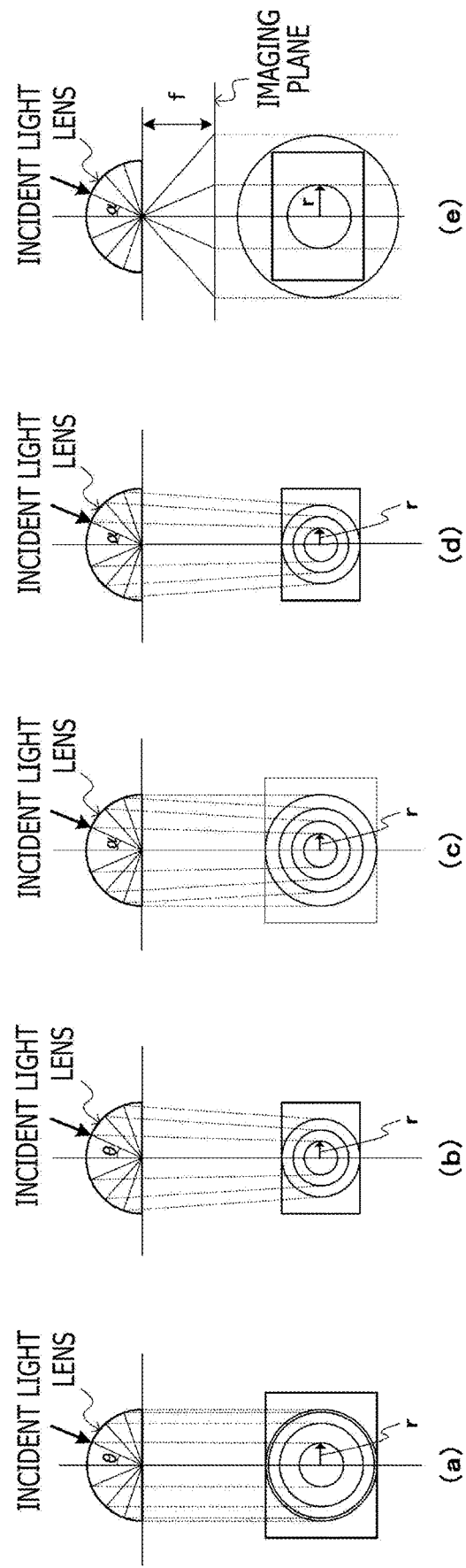
FIG. 4 depicts views illustrating projection methods of fisheye lenses.

The correction factor K can be decided on the basis of characteristic formulae of a fisheye image and a normal image, for example. FIG. 4 illustrates projection methods of fisheye lenses. Subfigure (a) in FIG. 4 illustrates an orthogonal projection method, and the relation (characteristic formula) between light that has entered at an angle of incidence a and the position y at which the light having entered is projected can be represented by Formula (3). Note that "f" is the focal length of the fisheye lens.

$$r=f\sin\alpha \qquad (3)$$

Subfigure (b) in FIG. 4 illustrates an equidistance projection method, and its characteristic formula is represented by Formula (4).

$$r=f\alpha \qquad (4)$$

Subfigure (c) in FIG. 4 illustrates a stereographic projection method, and its characteristic formula is represented by Formula (5).

$$r=2f\cdot\tan(\alpha/2) \quad (5)$$

Subfigure (d) in FIG. 4 illustrates an equisolid angle projection method, and its characteristic formula is represented by Formula (6).

$$r=2f\cdot\sin(\alpha/2) \quad (6)$$

Note that the projection method of a lens with which fisheye distortions are not generated (hereinafter, referred to as a "normal lens") is the central projection method illustrated in Subfigure (e) in FIG. 4, and its characteristic formula is represented by Formula (7).

$$r=f\cdot\tan\alpha \quad (7)$$

The correction factor for correcting fisheye distortions that are generated due to projection of a subject image by a fisheye lens can be computed on the basis of the characteristic formulae of the fisheye lens and the normal lens. For example, in a case where only lenses are changed while the focal lengths and image-capturing conditions are the same, in order to make the correction factor K a function of the distance r from the fisheye center as illustrated in Formula (1), the distance $r(\alpha)$ from the center of the fisheye lens, the distance $R(\alpha)$ from the center of the normal lens, and the correction factor $K(\alpha)$ are associated with each other by using a as a parameter. That is, the correction factor K=the characteristic formula of the normal lens/the characteristic formula of the fisheye lens.

FIG. 5 illustrates, for each projection method, the correction factor for correcting a fisheye image to a normal image. For example, the correction factor of the orthogonal projection method is "1/cos α." In addition, the correction factor of the equidistance projection method is "tan α/α," the correction factor of the stereographic projection method is "tan α/(2·tan(α/2))," and the correction factor of the equisolid angle projection method is "tan α/(2·sin(α/2))."

Figure 6:
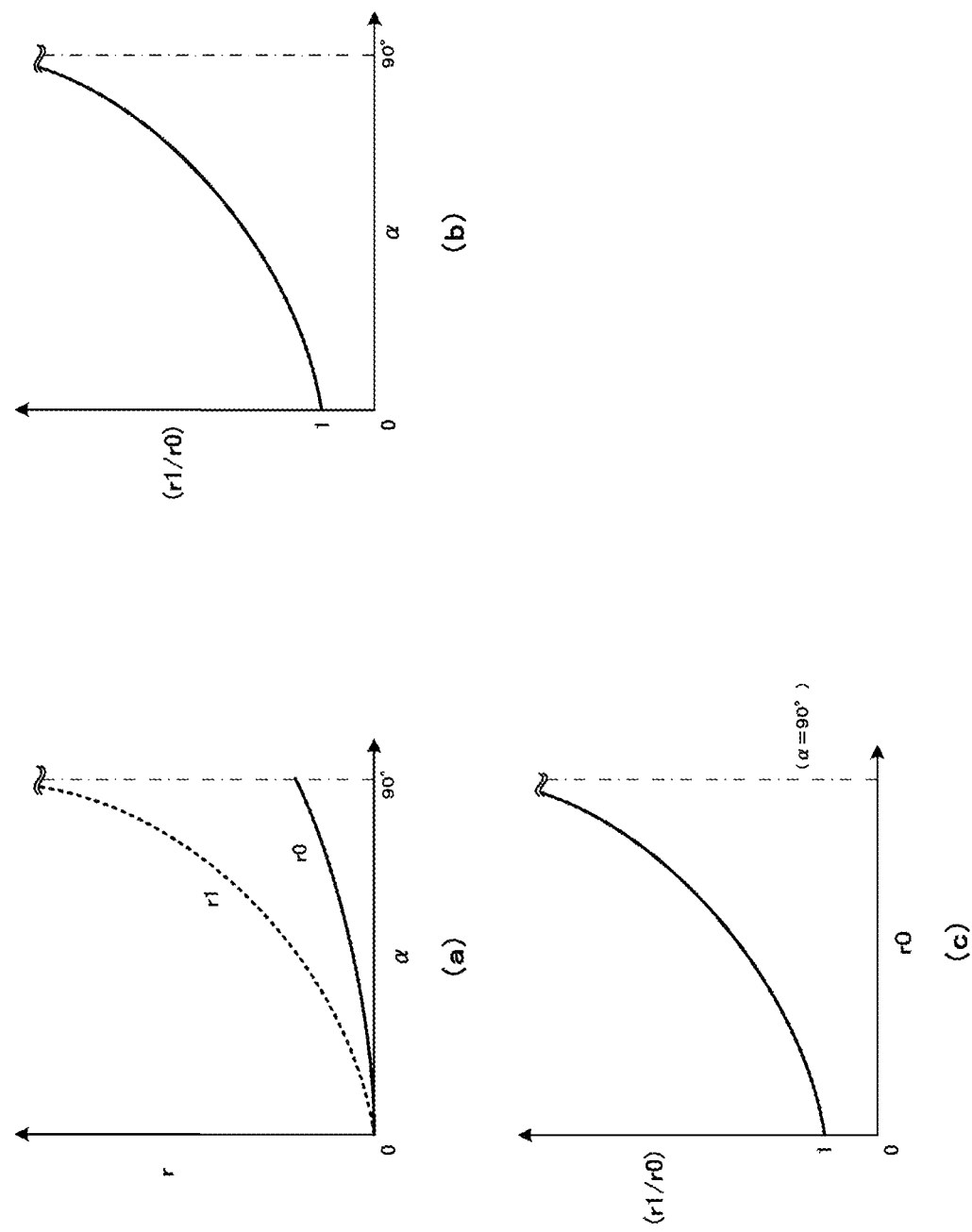
FIG. 6 depicts views for explaining derivation of correction factors.

FIG. 6 depicts views for explaining derivation of correction factors. As illustrated in Subfigure (a) in FIG. 6, the angle of incidence a is varied in the range 0≤α≤90°, and the values of the characteristic formulae of the fisheye lens and the normal lens (hereinafter, referred to as "characteristic values") that are observed at each angle of incidence a are recorded. Then, if the characteristic value before correction is r0, and the characteristic value after correction is r1, the correction factor (r1/r0) has characteristics illustrated in Subfigure (b) in FIG. 6. Note that, although the correction factor in a case where the angle of incidence is 0° is not defined because it is (0/0), the correction factor is set to 1 because the distortion at the center of the fisheye lens relative to the case where the normal lens is used is small. If the correction factor (r1/r0) is represented by using the characteristic value r0 as a reference value on the basis of results of Subfigure (a) in FIG. 6 and Subfigure (b) in FIG. 6, the relation of the correction factor (r1/r0) relative to the characteristic value r0 has characteristics illustrated in Subfigure (c) in FIG. 6. In addition, because the characteristic value varies depending on the focal length f, normalization of the range of the characteristic value r0 within the range of "0" to "1" enables acquisition of the correction factor (r1/r0) relative to a characteristic value r0 of interest on the basis of the correction factor obtained by normalizing the characteristic value r0, and the focal length. Note that, how correction factors are computed is not limited to the method mentioned above and may be realized by using other methods.

Figure 7:
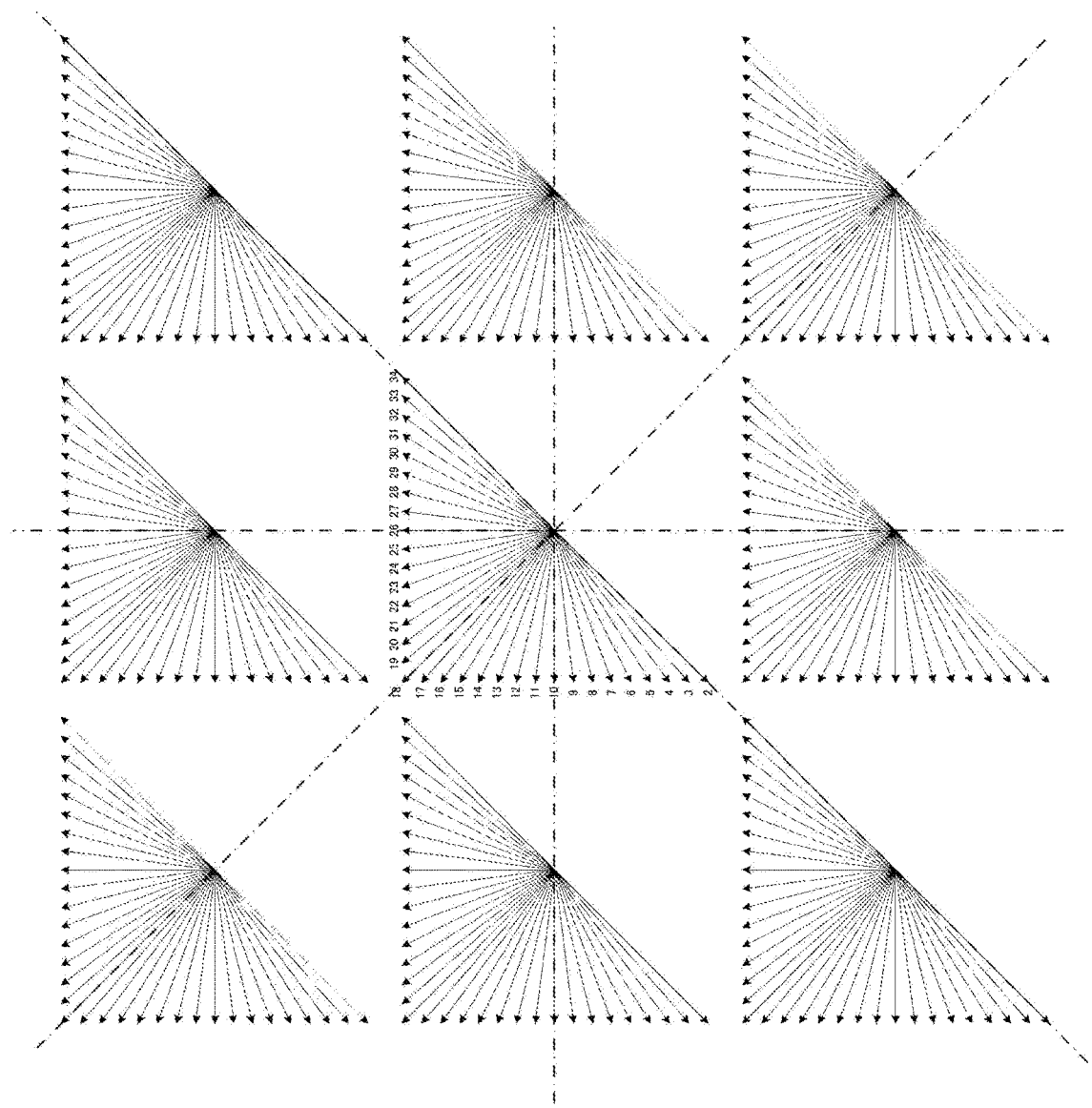
FIG. 7 is a view illustrating an intra-prediction mode table used for a normal image.
Figure 8:
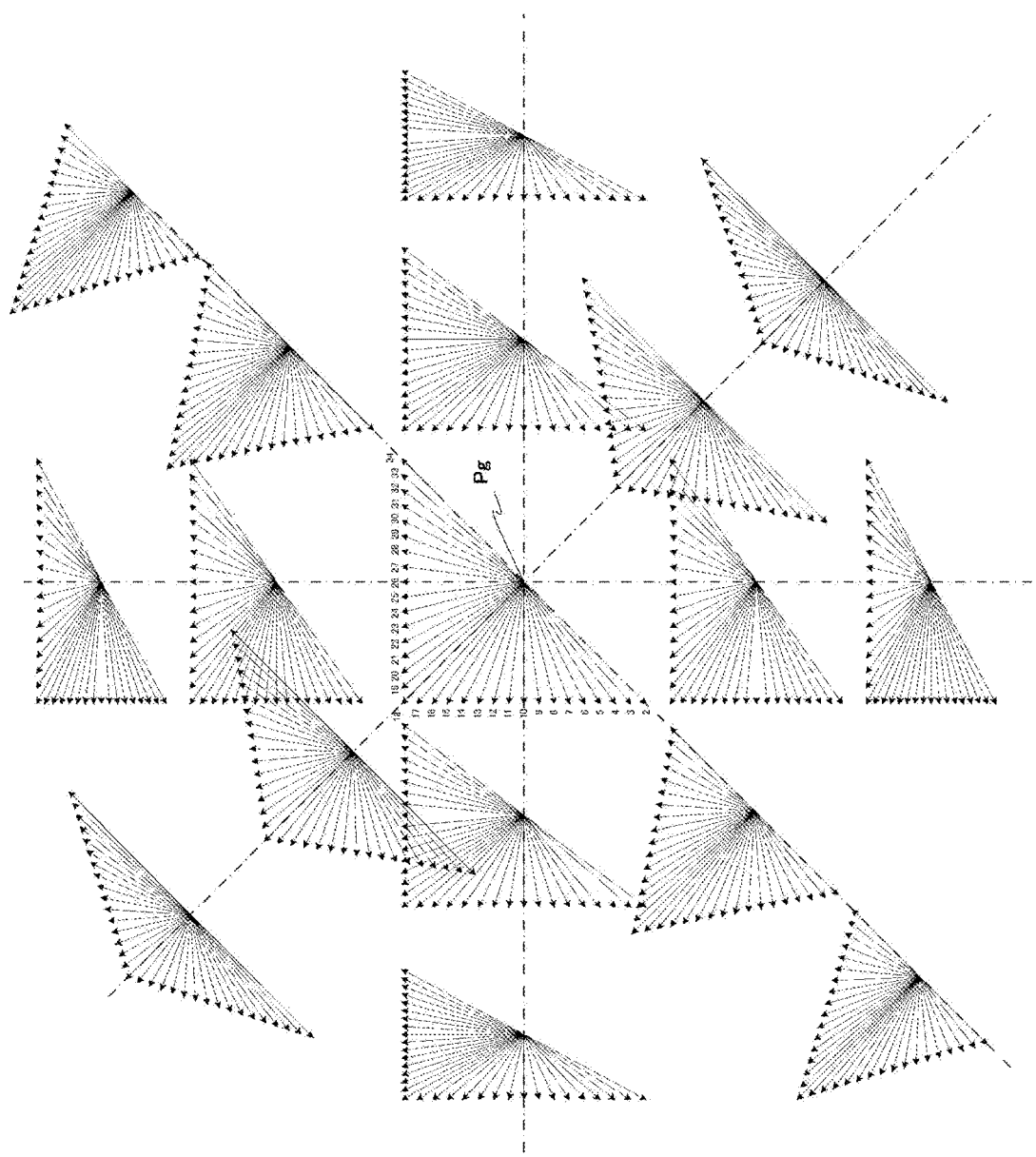
FIG. 8 is a view illustrating an intra-prediction mode table on which distortions are generated.

Because normal images do not have particular directional characteristics, in intra-prediction, an intra-prediction mode table (basic table) in which a predetermined plurality of prediction directions is set as prediction modes of direction prediction is used no matter which position the position of a processing target block is, as illustrated in FIG. 7. However, fisheye images have directional characteristics because there are distortions as mentioned above. Accordingly, intra-prediction that is more strictly based on patterns of a fisheye image is performed by using prediction modes in an intra-prediction mode table in which the directions and degrees of distortions in the basic table are changed according to the directions and distances from the fisheye center taking distortion characteristics into consideration and distortions illustrated in FIG. 8 are then generated (hereinafter, also referred to as a "distortion table"), and it is made possible to improve the encoding efficiency as compared to a case where the basic table is used. Note that FIG. 8 illustrates an example of the state that variations in the density of prediction directions occur because the basic table is compressed toward the fisheye center and that the lengths of vectors that are not necessary in intra-prediction are also adjusted according to the compression such that the state of the compression can be grasped easily.

Figure 9:
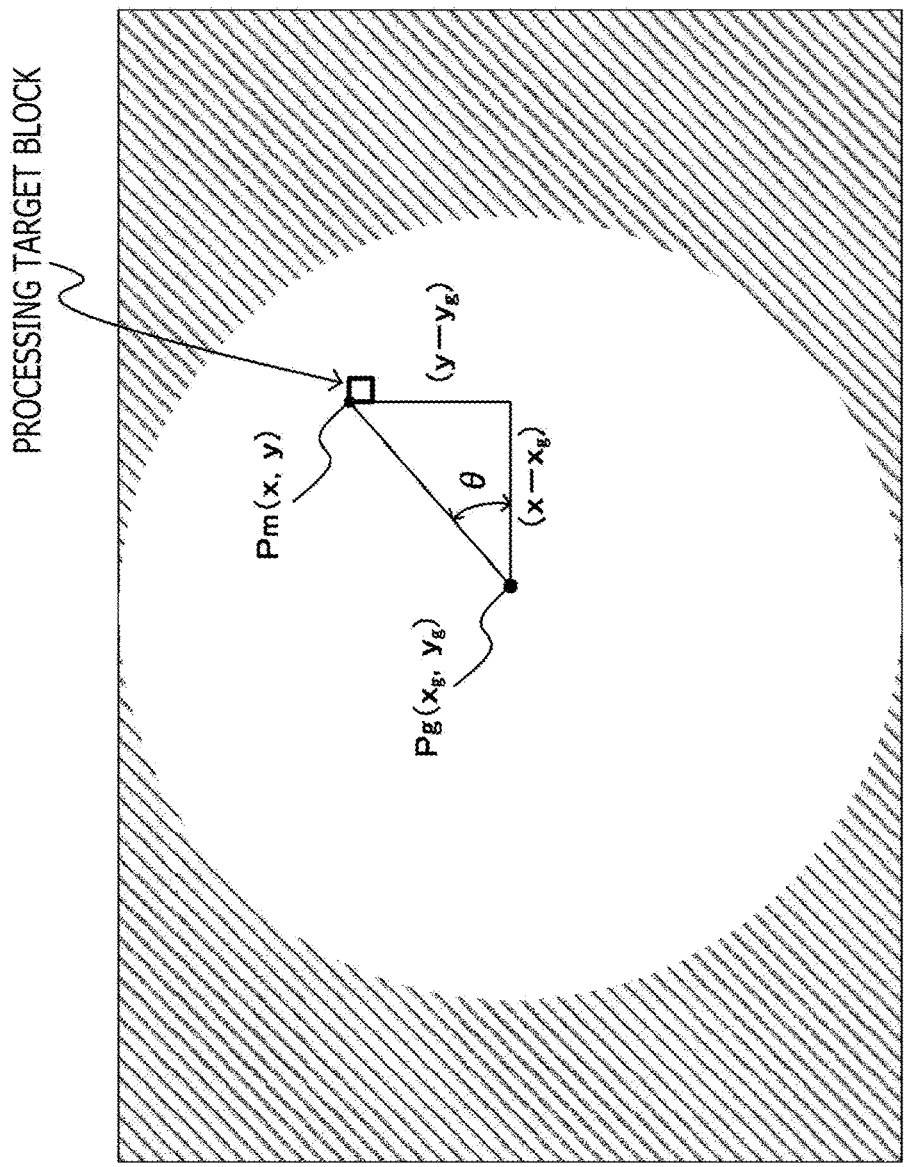
FIG. 9 is a view for explaining generation of a distortion table.

Next, generation of a distortion table is described with reference to FIG. 9. In a case where a distortion table for the position Pm(x,y) of a processing target block in a fisheye image is to be generated, the direction of the position Pm(x,y) as seen from the fisheye center Pg($x_g$,$y_g$) is specified. Specifically, as illustrated in FIG. 9, the angle θ representing the direction of the position Pm(x,y) as seen from the fisheye center Pg($x_g$,$y_g$) is computed on the basis of Formula (8).

$$\tan\theta=(y-y_g)/(x-x_g) \quad (8)$$

Figure 10:
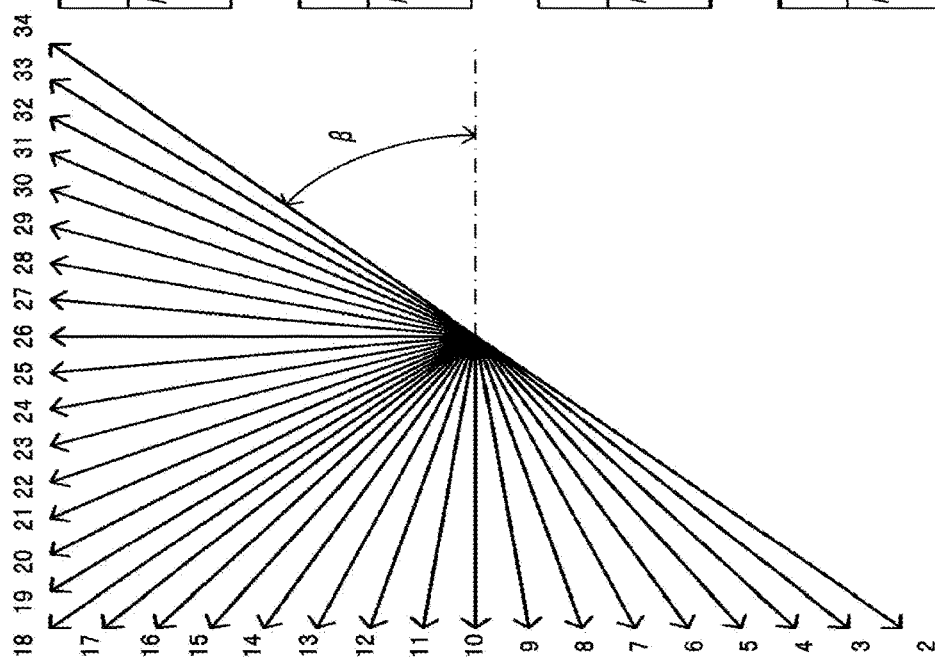
FIG. 10 depicts views illustrating a relation between prediction modes and inclinations in the intra-prediction mode table (basic table) used for a normal image.

FIG. 10 illustrates relations between prediction modes and inclinations in the intra-prediction mode table (basic table) used for a normal image. Subfigure (a) in FIG. 10 illustrates a reference direction for each prediction mode, and Subfigure (b) in FIG. 10 illustrates the reference direction (inclination) of a prediction mode for each prediction mode by an angle and tan β.

FIG. 11 depicts views for explaining prediction directions of intra-prediction. Subfigure (a) in FIG. 11 illustrates a prediction direction in a case where a basic table is used. The prediction direction tan β can be separated into the inclination θ1 of the position Pm(x,y) measured by using the fisheye center Pg(xg,yg) as a reference point, and the difference θ2 measured by using the inclination 91 as a reference inclination. That is, "θ=θ1+θ2." In addition, the inclination of the prediction direction can be decomposed into components cos θ2 which is the horizontal component and sin θ2 which is the vertical component, by using the line segment CM as a reference line segment.

Subfigure (b) in FIG. 11 illustrates a case where a distortion table is used. If the correction factor in a case where the position Pm(x,y) in a fisheye image is converted into a position in a normal image is "Km," the prediction direction tan βd in the distortion table can be obtained by adding the difference φ measured by using the inclination θ1 as a reference inclination to the inclination θ1 of the position Pm(x,y) measured by using the fisheye center Pg($x_g$,yg) as a reference position. Here, because the horizontal component measured by using the inclination θ1 as a reference inclination is compressed 1/Km-fold as compared to that in the basic table, tang is represented by Formula (9).

$$\tan\varphi=Km\cdot\sin\theta2/\cos\theta2=Km\cdot\tan\theta2 \quad (9)$$

That is, by computing tan(θ1+φ) from tan(θ1+θ2) in the basic table on the basis of Formula (10), the distortion table corresponding to the position Pm(x,y) can be generated. Note that the parameter a in Formula (10) is a value computed according to Formula (11), and the parameter b is a value computed according to Formula (12).

$$\tan(\theta 1+\varphi)=(ba^2+(1-Km)a+Kmb)/(Kma^2+(1-Km)ba+1) \quad (10)$$

$$a=\tan\theta 1=(y-y_g)/(x-x_g) \quad (11)$$

$$b=\tan(\theta 1+\theta 2) \quad (12)$$

FIG. 12 illustrates a relation between prediction modes and inclinations (in a case where θ1=π/4, Km=1.3) of an intra-prediction mode table (distortion table) used for a fisheye image. In the distortion table illustrated in FIG. 12, changes are made from the basic table illustrated in FIG. 10 such that the density increases as prediction directions get closer to 135°.

By performing a process like the one mentioned above, it is possible to generate an intra-prediction mode table (distortion table) according to the positions of processing target blocks, on the basis of correction factors at the positions of the processing target blocks and a predetermined intra-prediction mode table (reference table).

Meanwhile, if a distortion table is generated on the basis of the positions (correction factors) of processing target blocks on which intra-prediction is performed, the processing cost for direction prediction increases undesirably. In addition, in a case where a distortion table is generated and stored in advance for each position, the processing cost can be reduced, but the memory capacity required for storing the distortion tables increases undesirably. Accordingly, the processing cost of direction prediction and memory capacity required for the direction prediction are reduced by splitting a fisheye image into areas, preparing a distortion table in advance for each area, and using, at the intra-prediction section 41, a distortion table corresponding to an area to which a processing target block belongs.

FIG. 13 depicts views for explaining an area split of a fisheye image. The area split of a fisheye image is performed on the basis of correction factors. Correction factors are the same if distances from the center of the fisheye image are the same. Accordingly, the fisheye image is split in the radial direction by use of the center of the fisheye image as a reference point. In addition, the number of split areas (also referred to as the number of layers) of a fisheye image is set according to changes in the correction factors in the radial direction from the center of the fisheye image, that is, according to lens characteristics of the fisheye lens, and, for example, the number of layers is increased as the maximum value of the changes in the correction factors for a predetermined distance in the radial direction increases.

Subfigures (a) and (b) in FIG. 13 illustrate examples of cases that fisheye images are split into a plurality of areas according to correction factors. In a case where changes in correction factors in the radial direction from the center of a fisheye image are gradual, the number of layers is set to a predetermined number (the number of layers is set to "4" in Subfigure (a) in FIG. 13). In addition, in a case where changes in correction factors in the radial direction from the center of a fisheye image are steep, the number of layers is made greater as compared to a case where changes in correction factors are gradual (the number of layers is set to "5" in Subfigure (b) in FIG. 13).

By adjusting the number of split areas in the radial direction according to changes in correction factors in the radial direction from the center of a fisheye image in this manner, it becomes possible to prevent changes in correction factors within an area from increasing.

In addition, the degrees of distortions are the same at positions that are point-symmetric with respect to the center of a fisheye image (diagonally opposite positions). Accordingly, in the area split of a fisheye image, the fisheye image is split into areas in the circumferential direction by setting straight lines passing through the center of the fisheye image as boundaries of the areas. Note that, because distortions in the area including the center of the fisheye image are small, the area may not be split in the circumferential direction and that a basic table may be used as the intra-prediction mode table.

Subfigures (c) and (d) in FIG. 13 illustrate examples of cases that fisheye images are split into areas in the radial direction and the circumferential direction. Note that Subfigures (c) and (d) in FIG. 13 illustrate examples of cases that the fisheye images are split into eight in the circumferential direction. The split areas are given indices (table_idx) of corresponding distortion tables as table information, and it is made possible thereby to select the corresponding distortion tables on the basis of table information corresponding to pixel positions in a fisheye image, depending on which areas the pixel positions belong to. In addition, because the degrees of distortions are the same at positions that are point-symmetric with respect to the center of a fisheye image, areas at positions that are point-symmetric with respect to the center of the fisheye image are given the same indices.

A distortion table corresponding to each area is generated as described with reference to Subfigure (b) in FIG. 11, by setting an inclination θ1 and a correction factor Km for each area. For example, the center in the circumferential direction of an area with the index table_idx=10 is at an angle of 45°. In a case where the correction factor of the center in the radial direction is "1.3," for example, a distortion table illustrated in FIG. 12 in which the correction factor is computed as being Km=1.3 for the inclination of θ1=45° is used as the distortion table corresponding to the area with the index table_idx=10.

In this manner, the area split of a fisheye image is performed, a distortion table is provided for each split area, and a distortion table with an index corresponding to an area to which a processing target block belongs is used in intra-prediction.

Further, as illustrated in FIG. 4, there is a plurality of projection methods for fisheye lenses, and correction factors differ depending on the projection methods as illustrated in FIG. 5. Accordingly, a distortion table may be provided for each type of lens characteristics (e.g. a projection method) of a fisheye lens and for each area, and a distortion table according to the lens characteristics of a fisheye lens represented in fisheye information and the position of a processing target block may be selected. A distortion table for each type of lens characteristics of each fisheye lens and for each area may be stored in the table selecting section 412 of the intra-prediction section 41 in advance or may be supplied to the table selecting section 412 along with fisheye information or the like.

<2-2-2. Regarding Encoding Process Operation>

Figure 14:
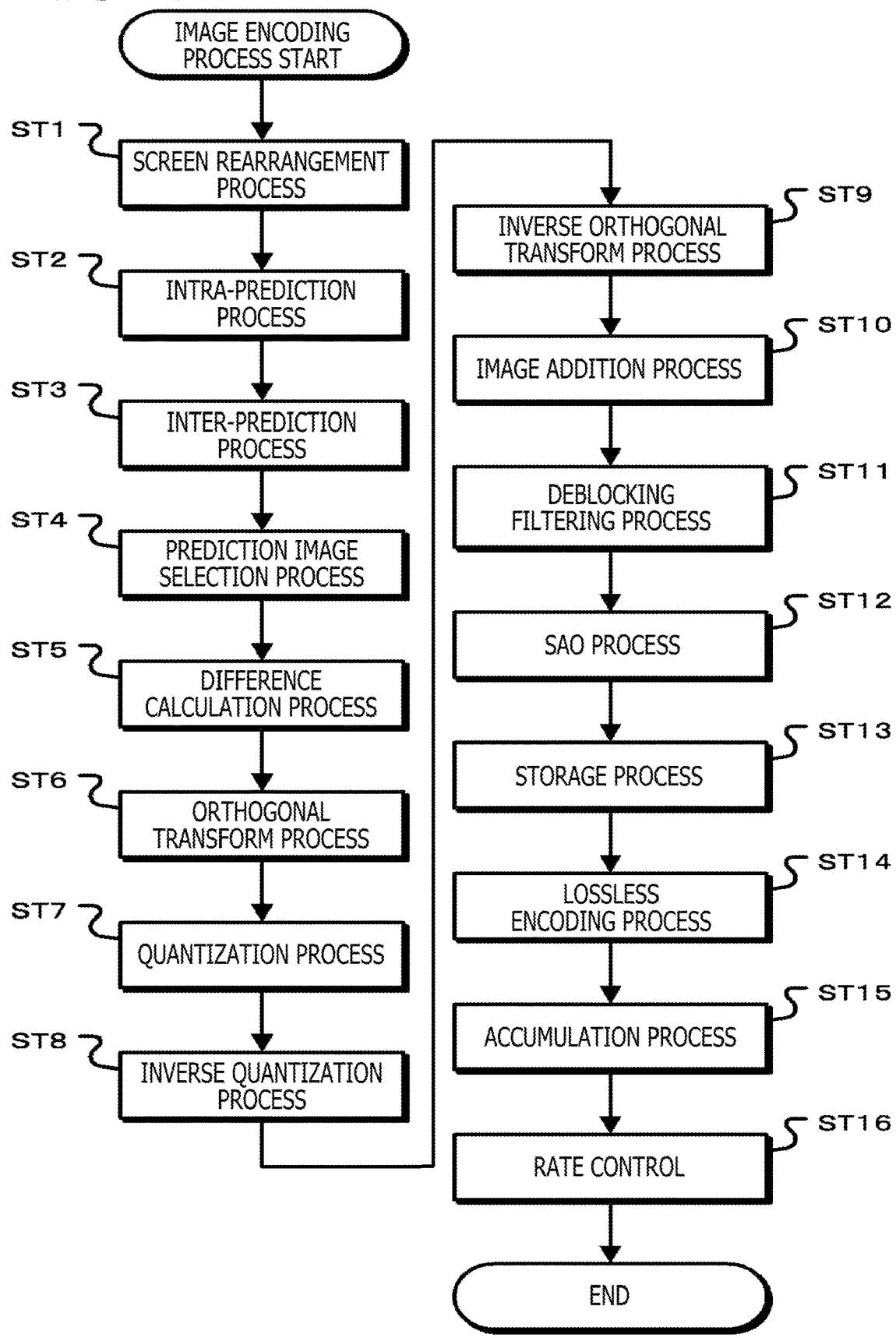
FIG. 14 is a flowchart illustrating an example of an encoding process operation by the image encoding apparatus.

Next, an encoding process operation is described. FIG. 14 is a flowchart illustrating an example of the encoding process operation by the image encoding apparatus.

At Step ST1, the image encoding apparatus performs a screen rearrangement process. The screen rearrangement buffer 21 of the image encoding apparatus 10 rearranges input images which are arranged in the order of display, in the order of encoding, and outputs the rearranged input images to the intra-prediction section 41, the inter-prediction section 42, and the SAO filter 35.

Figure 15:
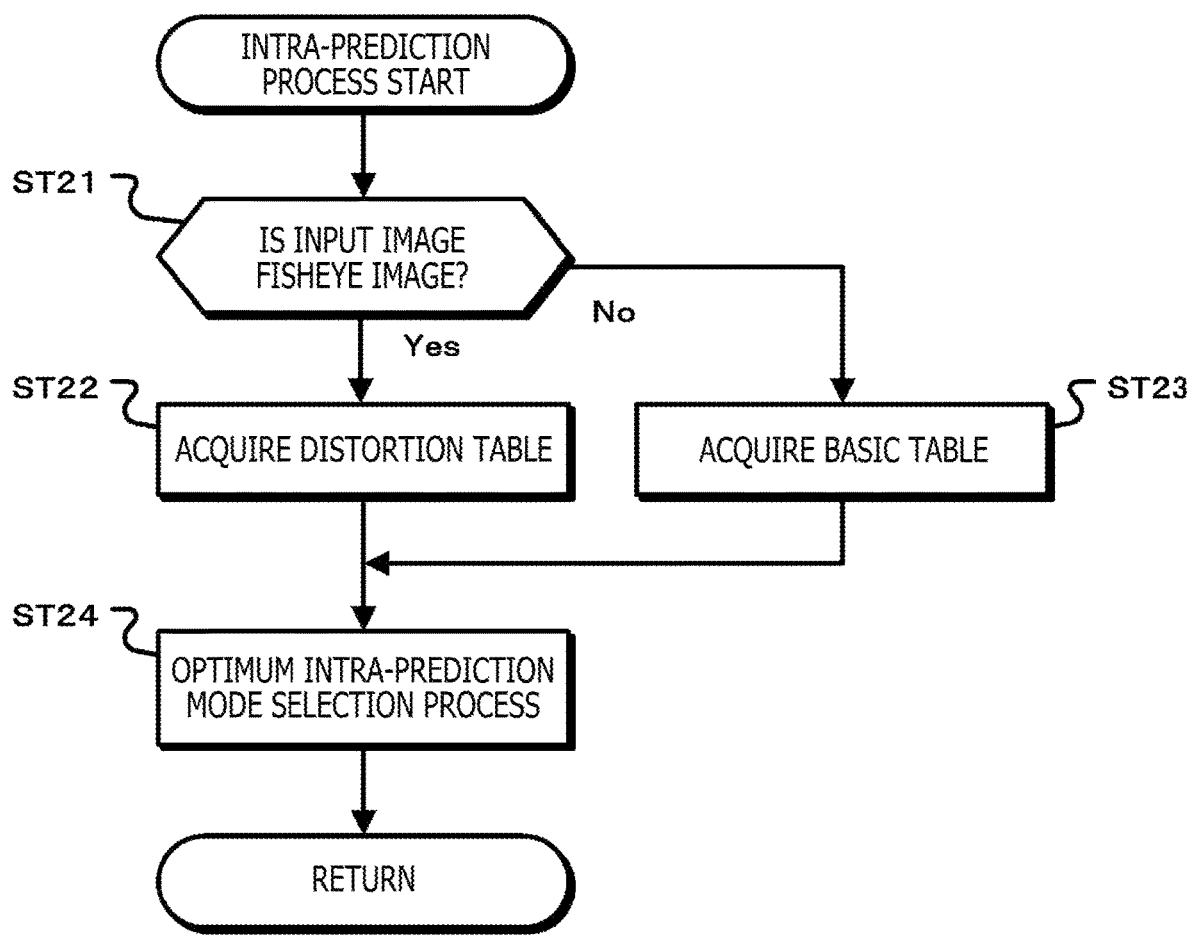
FIG. 15 is a flowchart illustrating an example of an intra-prediction process.

At Step ST2, the image encoding apparatus performs an intra-prediction process. FIG. 15 is a flowchart illustrating an example of the intra-prediction process. At Step ST21, the intra-prediction section identifies whether the input image is a fisheye image. In a case where the intra-prediction section 41 of the image encoding apparatus 10 identifies on the basis of fisheye information that the input image is a fisheye image, the intra-prediction section 41 proceeds to Step ST22, and in a case where the intra-prediction section 41 identifies that the input image is not a fisheye image, the intra-prediction section 41 identifies that the input image is a normal image, and proceeds to Step ST23.

At Step ST22, the intra-prediction section acquires a distortion table. The intra-prediction section 41 acquires a distortion table according to the position of a processing target block relative to a fisheye center. In addition, in a case where the fisheye image is split into a plurality of areas and a distortion table is provided for each area, the intra-prediction section 41 acquires a distortion block corresponding to an area to which a processing target block belongs. Further, in a case where a distortion table is provided for each type of lens characteristics of a fisheye lens and for each area, the intra-prediction section 41 acquires a distortion table corresponding to the lens characteristics of a fisheye lens represented in fisheye information and to an area to which a processing target block belongs. The intra-prediction section 41 acquires a distortion table, and proceeds to Step ST24.

At Step ST23, the intra-prediction section acquires a basic table. Because the input image is a normal image, the intra-prediction section 41 acquires the basic table, and proceeds to Step ST24.

At Step ST24, the intra-prediction section performs an optimum intra-prediction mode selection process. The intra-prediction section 41 performs direction prediction by use of the distortion table acquired at Step ST22 or the basic table acquired at Step ST23 and reference image data read out from the frame memory 36, and generates, for each prediction block size, prediction image data of a processing target block in an intra-prediction mode represented in the distortion table or the basic table. The intra-prediction section 41 computes cost function values by using the generated prediction image data and original image data. Note that decoded image data having not been subjected to a filtering processed by the deblocking filter 34 or the like is used as the reference image data. The intra-prediction section 41 selects an optimum intra-prediction mode on the basis of the computed cost function values, and outputs, to the prediction selecting section 43, the prediction image data generated by intra-prediction in the optimum intra-prediction mode, the cost function value, and the intra-prediction information.

Returning to FIG. 14, the image encoding apparatus performs an inter-prediction process at Step ST3. The inter-prediction section 42 acquires a reference picture according to a current picture, and performs, for all the prediction modes, motion searches to find to which area in the reference picture a current prediction block in the current picture corresponds. In addition, the inter-prediction section 42 performs an optimum inter-prediction mode selection process, compares the cost function value computed for each prediction mode, and selects, as an optimum inter-prediction mode, a prediction mode that minimizes the cost function value, for example. In addition, on the basis of fisheye information, the inter-prediction section 42 adjusts a motion vector to be used for a computation of a predicted motion vector, and computes a predicted motion vector by using the adjusted motion vector. The inter-prediction section 42 performs a motion compensation in the selected optimum inter-prediction mode, and generates prediction image data. Further, the inter-prediction section 42 outputs, to the prediction selecting section 43, the prediction image data and the cost function value which are generated in the optimum inter-prediction mode, and the inter-prediction information, and proceeds to ST4.

At Step ST4, the image encoding apparatus performs a prediction image selection process. On the basis of the cost function value computed at Step ST2 and Step ST3, the prediction selecting section 43 of the image encoding apparatus 10 decides either the optimum intra-prediction mode or the optimum inter-prediction mode as an optimum prediction mode. Then, the prediction selecting section 43 selects the prediction image data of the decided optimum prediction mode, and outputs the prediction image data to the calculating sections 22 and 33. Note that the prediction image data is used for calculations at Steps ST5 and ST10 mentioned below. In addition, the prediction selecting section 43 outputs the intra-prediction information or inter-prediction information of the optimum prediction mode to the lossless encoding section 25.

At Step ST5, the image encoding apparatus performs a difference calculation process. The calculating section 22 of the image encoding apparatus 10 computes a difference between the original image data rearranged at Step ST2, and the prediction image data selected at Step ST4, outputs residual data which is a result of the differentiation to the orthogonal transforming section 23.

At Step ST6, the image encoding apparatus performs an orthogonal transform process. The orthogonal transforming section 23 of the image encoding apparatus 10 performs an orthogonal transform on the residual data supplied from the calculating section 22. Specifically, an orthogonal transform such as the discrete cosine transform is performed, and an obtained transform coefficient is output to the quantizing section 24.

At Step ST7, the image encoding apparatus performs a quantization process. The quantizing section 24 of the image encoding apparatus 10 quantizes the transform coefficient supplied from the orthogonal transforming section 23. In this quantization, the rate is controlled as described in the process at Step ST16 mentioned below.

The thus-generated quantization information is decoded locally in the following manner. That is, the image encoding apparatus performs an inverse quantization process at Step ST8. The inverse quantizing section 31 of the image encoding apparatus 10 performs inverse quantization on the quantized data output from the quantizing section 24 according to characteristics corresponding to the quantizing section 24.

At Step ST9, the image encoding apparatus performs an inverse orthogonal transform process. The inverse orthogonal transforming section 32 of the image encoding apparatus 10 performs an inverse orthogonal transform on the inverse-quantized data generated by the inverse quantizing section 31 according to characteristics corresponding to the orthogonal transforming section 23 to thereby generate residual data, and outputs the generated residual data to the calculating section 33.

At Step ST10, the image encoding apparatus performs an image addition process. The calculating section 33 of the image encoding apparatus 10 adds the prediction image data output from the prediction selecting section 43 to the locally decoded residual data, and generates a locally decoded image (i.e. an image which has been subjected to local decoding).

At Step ST11, the image encoding apparatus performs a deblocking filtering process. The deblocking filter 34 of the image encoding apparatus 10 performs a deblocking filtering process on the image data output from the calculating section 33, eliminates block distortions, and outputs the image data to the SAO filter 35 and the frame memory 36.

At Step ST12, the image encoding apparatus performs an SAO process. The SAO filter 35 of the image encoding apparatus 10 performs an SAO process on the image data output from the deblocking filter 34. As a result of this SAO process, the type and coefficient of the SAO process are obtained for each LCU, which is the largest encoding unit, and a filtering process is performed by use of the type and coefficient. The SAO filter 35 causes the image data after the SAO process to be stored in the frame memory 36. In addition, the SAO filter 35 outputs parameters related to the SAO process to the lossless encoding section 25, and the parameters are encoded at Step ST14 as described below.

At Step ST13, the image encoding apparatus performs a storage process. The frame memory 36 of the image encoding apparatus 10 stores an image having not been subjected to a filtering process at the deblocking filter 34 or the like, and an image having been subjected to the filtering process at the deblocking filter 34 or the like.

Meanwhile, the transform coefficient quantized at Step ST7 mentioned above is output also to the lossless encoding section 25. At Step ST14, the image encoding apparatus performs a lossless encoding process. The lossless encoding section 25 of the image encoding apparatus 10 encodes the transform coefficient after the quantization which is output from the quantizing section 24, and the supplied fisheye information, intra-prediction information, inter-prediction information, and the like.

At Step ST15, the image encoding apparatus performs an accumulation process. The accumulation buffer 26 of the image encoding apparatus 10 accumulates the encoded data. The encoded data accumulated in the accumulation buffer 26 is read out as appropriate, and is transmitted toward the decoding side via a transmission path or the like.

At Step ST16, the image encoding apparatus performs rate control. The rate control section 27 of the image encoding apparatus 10 controls the rate of the quantization operation by the quantizing section 24 such that an overflow or an underflow of the encoded data accumulated in the accumulation buffer 26 does not occur.

According to such an image encoding apparatus, when an input image is a fisheye image, intra-prediction is performed by use of a distortion table in which variations in the density of prediction directions are adjusted according to fisheye distortions that are generated at the positions of processing target blocks. Accordingly, it becomes possible to improve the encoding efficiency as compared to a case where intra-prediction is performed by use of a basic table in which variations in the density of prediction directions are not adjusted. In addition, by including fisheye information in an encoded stream when an input image is a normal image, it becomes possible for an image decoding apparatus to identify, on the basis of whether or not there is fisheye information or on the basis of fisheye information, whether an input image is a normal image or a fisheye image. In addition, it becomes possible for the image decoding apparatus to identify that intra-prediction by use of a basic table is performed when an input image is a normal image and that intra-prediction by use of a distortion table is performed when an input image is a fisheye image. Fisheye information is included in an encoded stream as syntax information, for example. In addition, because the fisheye information does not change until sequences is switched from one to another, it is sufficient if syntax representing fisheye information is provided in a sequence layer.

In addition, by including lens characteristics of a fisheye lens in fisheye information, an encoding process and a decoding process can be performed by use of, at the image encoding apparatus and the image decoding apparatus, a distortion table corresponding to the fisheye lens used for acquisition of a fisheye image. Further, information representing the number of layers and division positions illustrated in FIG. 13 may be provided in a sequence layer as syntax. In addition, area split intervals in the radial direction may be set according to lens characteristics of a fisheye lens. For example, correction factors, the numbers of layers, and interval ratios may be associated with one another. FIG. 16 illustrates an example of a relation between a correction factor and an interval ratio in each layer in a case where the number of layers=4. For example, for the zeroth layer, the correction factor is "1.0," and the radial interval ratio is "0.4" relative to the fisheye radius. For the first layer, the correction factor is "1.1," and the radial interval ratio is "0.3" relative to the fisheye radius. For the second layer, the correction factor is "1.2," and the radial interval ratio is "0.2" relative to the fisheye radius. For the third layer, the correction factor is "1.3," and the radial interval ratio is "0.1" relative to the fisheye radius. Accordingly, it becomes possible to split a fisheye image into areas as illustrated in Subfigure (c) in FIG. 13 on the basis of information representing the number of layers and division positions, and it becomes possible to use, equally also in image decoding, a distortion table for each area used at the image encoding apparatus.

<2-3. Configuration of Image Decoding Apparatus>

Figure 17:
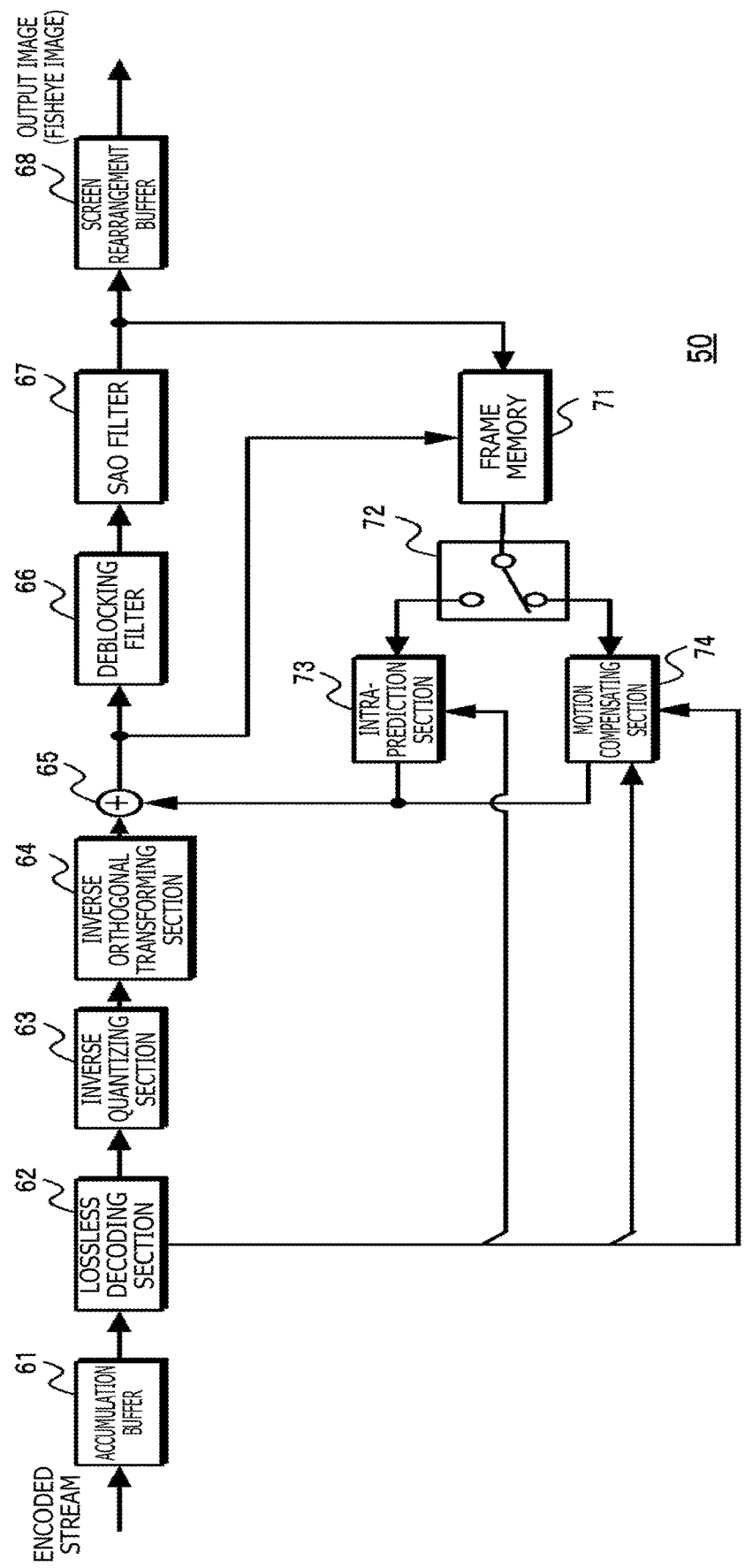
FIG. 17 is a view illustrating an example of a configuration of an image decoding apparatus.

FIG. 17 illustrates an example of the configuration of the image decoding apparatus that performs a decoding process on an encoded stream of a fisheye image, and an image decoding apparatus 50 is the image decoding apparatus corresponding to the image encoding apparatus 10 illustrated in FIG. 1. An encoded stream generated and encoded by the image encoding apparatus 10 is supplied to and decoded by the image decoding apparatus 50.

The image decoding apparatus 50 has an accumulation buffer 61, a lossless decoding section 62, an inverse quantizing section 63, an inverse orthogonal transforming section 64, a calculating section 65, a deblocking filter 66, an SAO filter 67, and a screen rearrangement buffer 68. In addition, the image decoding apparatus 50 has a frame memory 71, a selecting section 72, an intra-prediction section 73, and a motion compensating section 74.

The accumulation buffer 61 receives and accumulates a transmitted encoded stream. This encoded stream is read out at a predetermined timing, and output to the lossless decoding section 62.

The lossless decoding section 62 has a functionality of performing parsing. The lossless decoding section 62 parses information included in a decoding result of the encoded stream, for example, parses fisheye information, intra-prediction information, inter-prediction information, filter control information, and the like, and supplies them to blocks that need them. For example, the intra-prediction information and the fisheye information are output to the intra-prediction section 73, the inter-prediction information and the fisheye information are output to the motion compensating section 74, and the filter control information is output to the SAO filter 67. In addition, the lossless decoding section 62 outputs, to the inverse quantizing section 63, a quantization coefficient as encoded data included in the decoding result of the encoded bitstream.

On the quantized data obtained as a result of the decoding by the lossless decoding section 62, the inverse quantizing section 63 performs inverse quantization in a method corresponding to the quantization method of the quantizing section 24 illustrated in FIG. 1. The inverse quantizing section 63 outputs inverse-quantized data to the inverse orthogonal transforming section 64.

The inverse orthogonal transforming section 64 performs an inverse orthogonal transform in a method corresponding to the orthogonal transform method of the orthogonal transforming section 23 illustrated in FIG. 1, obtains decoding residual data corresponding to the residual data before the orthogonal transform at the image encoding apparatus 10, and outputs the decoding residual data to the calculating section 65.

The calculating section 65 is supplied with prediction image data from the intra-prediction section 73 or the motion compensating section 74. The calculating section 65 adds together the decoding residual data and the prediction image data to thereby obtain decoded image data corresponding to the original image data before the subtraction of the prediction image data by the calculating section 22 of the image encoding apparatus 10. The calculating section 65 outputs the decoded image data to the deblocking filter 66.

The deblocking filter 66 eliminates block distortions in a decoded image by performing a deblocking filtering process. The deblocking filter 66 outputs image data after the filtering process to the SAO filter 67.

The SAO filter 67 performs the SAO process on the image data after the filtering by the deblocking filter 66. By using a parameter supplied from the lossless decoding section 62, the SAO filter 67 performs, for each LCU, a filtering process on the image data after the filtering by the deblocking filter 66, and outputs the image data to the screen rearrangement buffer 68.

The screen rearrangement buffer 68 performs image rearrangement. That is, the order of frames rearranged by the screen rearrangement buffer 21 illustrated in FIG. 1 for the order of encoding is rearranged in the original order of display.

An output of the SAO filter 67 is supplied further to the frame memory 71. The selecting section 72 reads out image data used for intra-prediction from the frame memory 71, and outputs the image data to the intra-prediction section 73. In addition, the selecting section 72 reads out, from the frame memory 71, image data to be subjected to an inter-process and image data to be referred to, and outputs these pieces of image data to the motion compensating section 74.

The intra-prediction section 73 has a configuration which is similar to the configuration of the intra-prediction section 41 illustrated in FIG. 2 of the image encoding apparatus 10 and is different in that the optimum mode deciding section 414 is excluded. In the image decoding apparatus 50, the operation by the prediction image generating section 413 is different from that in the image encoding apparatus 10. The intra-prediction section 73 selects an intra-prediction mode table which is the same as the one for the encoding process on the basis of the fisheye information supplied from the lossless decoding section 62 and the position of a processing target block, and the prediction image generating section performs a decoding process in an optimum intra-prediction mode supplied from the lossless decoding section 62 by using the decoded image data acquired from the frame memory 71, generates prediction image data, and outputs the prediction image data to the calculating section 65.

On the basis of fisheye information and inter-prediction information output by parsing information included in the decoding result of the encoded bitstream by the lossless decoding section 62, the motion compensating section 74 generates prediction image data from the image data acquired from the frame memory 71, and outputs the prediction image data to the calculating section 65. In addition, in a case where a fisheye image is decoded, similarly to the inter-prediction section 42 of the image encoding apparatus 10, the motion compensating section 74 performs an adjustment of a motion vector to be used for a computation of a predicted motion vector of a current prediction block. The motion compensating section 74 performs a motion compensation by using the motion vector of the current prediction block computed by using the adjusted motion vector, and generates prediction image data.

<2-4. Operation by Image Decoding Apparatus>

Figure 18:
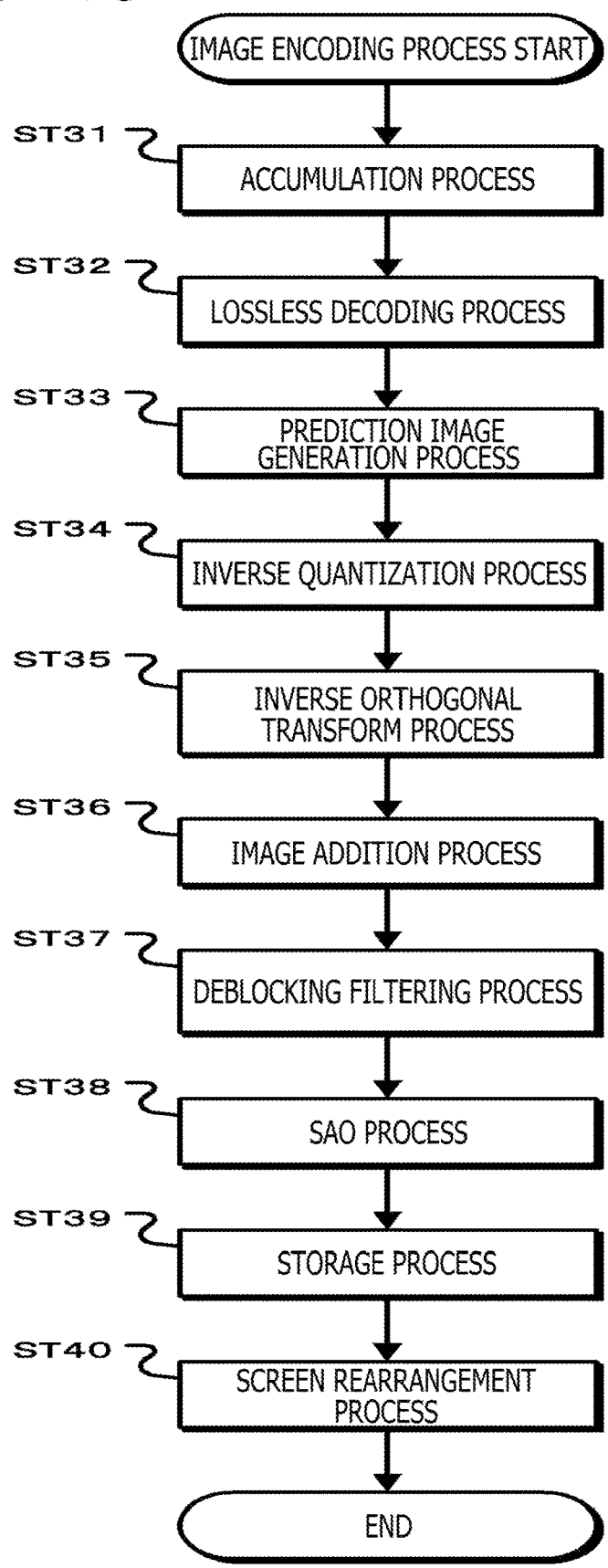
FIG. 18 is a flowchart illustrating an example of an operation by the image decoding apparatus.

Next, an operation in an embodiment of the image decoding apparatus will be described. FIG. 18 is a flowchart illustrating an example of the operation by the image decoding apparatus.

When a decoding process is started, at Step ST31, the image decoding apparatus performs an accumulation process. The accumulation buffer 61 of the image decoding apparatus 50 receives and accumulates a transmitted encoded stream.

At Step ST32, the image decoding apparatus performs a lossless decoding process. The lossless decoding section 62 of the image decoding apparatus 50 decodes the encoded stream supplied from the accumulation buffer 61. The lossless decoding section 62 parses information included in a decoding result of the encoded stream, and supplies the information to blocks that need it. The lossless decoding section 62 outputs fisheye information and intra-prediction information to the intra-prediction section 73, and outputs the fisheye information and the inter-prediction information to the motion compensating section 74.

At Step ST33, the image decoding apparatus performs a prediction image generation process. The intra-prediction section 73 or the motion compensating section 74 of the image decoding apparatus 50 performs a prediction image generation process corresponding to intra-prediction information or inter-prediction information each of which is supplied from the lossless decoding section 62.

Figure 19:
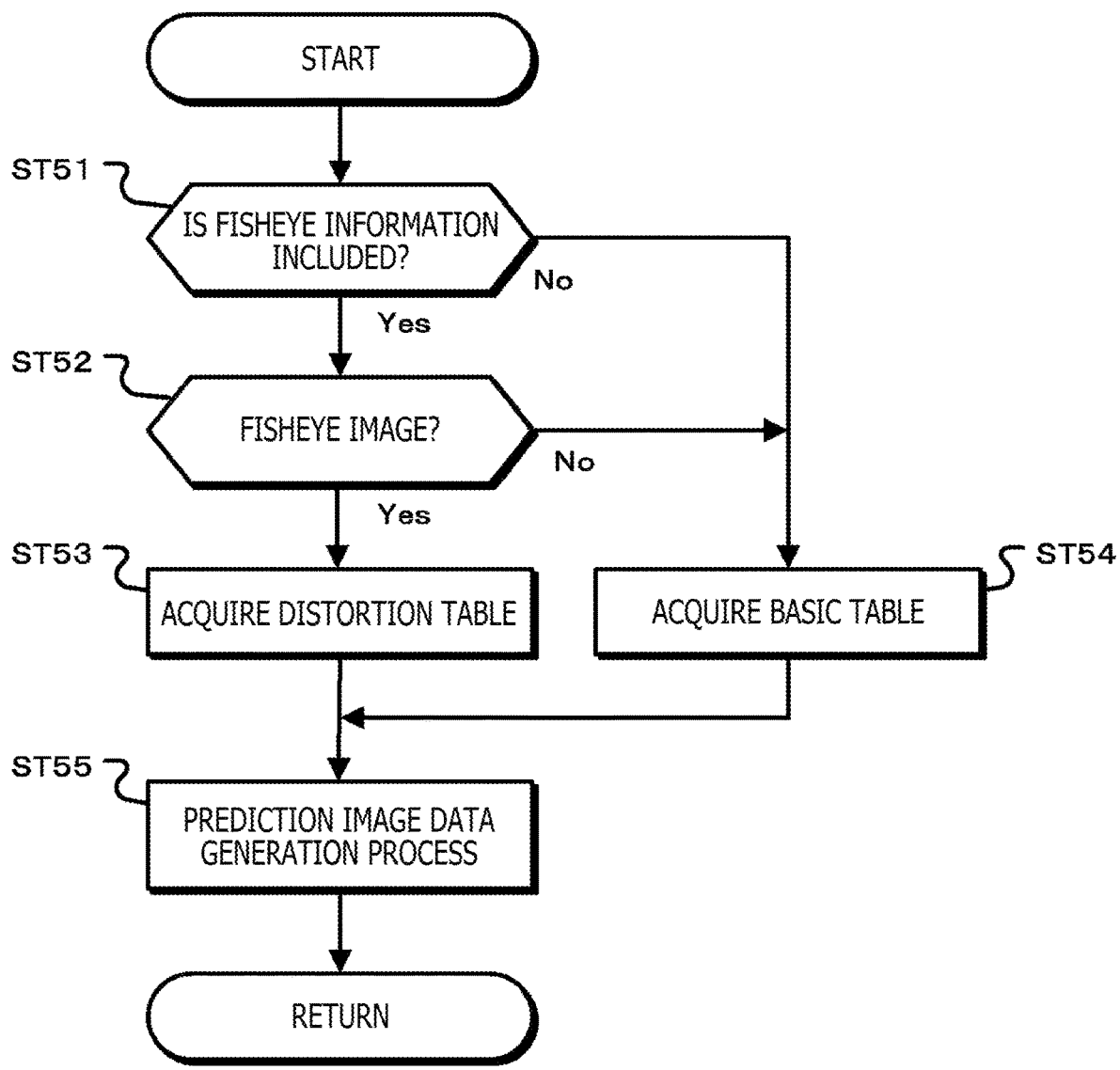
FIG. 19 is a flowchart illustrating a prediction image generation process in intra-prediction.

That is, in a case where the intra-prediction section 73 is supplied with fisheye information and intra-prediction information from the lossless decoding section 62, the intra-prediction section 73 performs generation of prediction image data by using a distortion table according to a processing target pixel position when an encoded stream represents a fisheye image, and performs generation of prediction image data in an optimum intra-prediction mode by using a basic table when an encoded stream represents a normal image. In a case where the motion compensating section 74 is supplied with fisheye information and inter-prediction information from the lossless decoding section 62, the motion compensating section 74 performs a motion compensation process in the optimum inter-prediction mode, and generates prediction image data. FIG. 19 is a flowchart illustrating a prediction image generation process in intra-prediction.

At Step ST51, the intra-prediction section 73 identifies whether fisheye information is included. In a case where fisheye information is included in the encoded stream, the intra-prediction section 73 proceeds to Step ST52, and in a case where fisheye information is not included, the intra-prediction section 73 identifies the encoded stream as an encoded stream of a normal image, and proceeds to Step ST54.

At Step ST52, the intra-prediction section 73 identifies whether the encoded stream is an encoded stream of a fisheye image. In a case where fisheye information included in the encoded stream represents that the encoded stream is an encoded stream of a fisheye image, the intra-prediction section 73 proceeds to Step ST53, and in a case where fisheye information included in the encoded stream represents that the encoded stream is not an encoded stream of a fisheye image, that is, the encoded stream is an encoded stream of a normal image, the intra-prediction section 73 proceeds to Step ST54.

At Step ST53, the intra-prediction section 73 acquires a distortion table. The intra-prediction section 73 acquires a distortion table according to the position of a processing target block relative to the fisheye center, and proceeds to Step ST55.

At Step ST54, the intra-prediction section acquires a basic table. Because the input image is a normal image, the intra-prediction section 73 acquires the basic table, and proceeds to Step ST55.

At Step ST55, the intra-prediction section performs a prediction image data generation process. By using the reference image data read out from the frame memory 71 and the distortion table acquired at Step ST53 or the basic table acquired at Step ST54, the intra-prediction section 73 generates prediction image data in an optimum intra-prediction mode represented in the intra-prediction information. The intra-prediction section 41 outputs the generated prediction image data to the calculating section 65.

Returning to FIG. 18, at Step ST34, the image decoding apparatus performs an inverse quantization process. On the quantized data obtained by the lossless decoding section 62, the inverse quantizing section 63 of the image decoding apparatus 50 performs inverse quantization in a method corresponding to the quantization method of the quantizing section 24 illustrated in FIG. 1, and outputs the inverse-quantized data to the inverse orthogonal transforming section 64.

At Step ST35, the image decoding apparatus performs an inverse orthogonal transform process. The inverse orthogonal transforming section 64 of the image decoding apparatus 50 performs an inverse orthogonal transform in a method corresponding to the orthogonal transform method of the orthogonal transforming section 23 illustrated in FIG. 1, obtains decoding residual data corresponding to the residual data before the orthogonal transform at the image encoding apparatus 10, and outputs the decoding residual data to the calculating section 65.

At Step ST36, the image decoding apparatus performs an image addition process. The calculating section 65 of the image decoding apparatus 50 adds together the prediction image data generated by the intra-prediction section 73 or the motion compensating section 74 at Step ST33 and the decoding residual data supplied from the inverse orthogonal transforming section 64, and generates decoded image data. The calculating section 65 outputs the generated decoded image data to the deblocking filter 66 and the frame memory 71.

At Step ST37, the image decoding apparatus performs a deblocking filtering process. The deblocking filter 66 of the image decoding apparatus 50 performs a deblocking filtering process on the image output by the calculating section 65. Thereby, block distortions are eliminated. The decoded image from the deblocking filter 66 is output to the SAO filter 67.

At Step ST38, the image decoding apparatus performs an SAO process. By using parameters related to the SAO process supplied from the lossless decoding section 62, the SAO filter 67 of the image decoding apparatus 50 performs the SAO process on the image having been subjected to the filtering by the deblocking filter 66. The SAO filter 67 outputs the decoded image data after the SAO process to the screen rearrangement buffer 68 and the frame memory 71.

At Step ST39, the image decoding apparatus performs a storage process. The frame memory 71 of the image decoding apparatus 50 stores decoded image data before the filtering processes supplied from the calculating section 65, and decoded image data on which the filtering processes have been performed by the deblocking filter 66 and the SAO filter 67.

At Step ST40, the image decoding apparatus performs a screen rearrangement process. The screen rearrangement buffer 68 of the image decoding apparatus 50 accumulates decoded image data supplied from the SAO filter 67, and outputs the accumulated decoded image data in the order of display in which the image data has been arranged before the rearrangement by the screen rearrangement buffer 21 of the image encoding apparatus 10.

If such a decoding process is performed, decoding of the encoded stream generated by the image encoding apparatus 10 mentioned above is performed, so that the fisheye image encoded by the image encoding apparatus 10 can be output from the image decoding apparatus 50.

In addition, because prediction image data is generated by use of a basic table in a case where fisheye information is not included, conventional encoded-stream decoding processes can also be performed.

3. Second Embodiment

In a second embodiment, prediction modes in direction prediction are selectively used in intra-prediction. In addition, in the selection of a prediction mode, a prediction mode to be selected is decided according to distortions of a fisheye image.

<3-1. Configuration of Image Encoding Apparatus>

The image encoding apparatus according to the second embodiment has a configuration similar to that of the image encoding apparatus according to the first embodiment illustrated in FIG. 1 and is different in the operations by the lossless encoding section 25 and the intra-prediction section 41.

For each CTU, the lossless encoding section 25 performs a lossless encoding process on the quantized data input from the quantizing section 24, for example, a lossless encoding process of CABAC (Context-Adaptive Binary Arithmetic Coding). In addition, the lossless encoding section 25 acquires fisheye information, parameters of a prediction mode selected by the prediction selecting section 43, for example, information representing an intra-prediction mode, or information representing an inter-prediction mode, motion information, and the like. Further, from the SAO filter 35 mentioned below, the lossless encoding section 25 acquires parameters regarding a filtering process. Further, the lossless encoding section 25 acquires block information representing how CTUs, CUs, TUs and PUs should be set for an image. In addition to encoding of the quantized data, the lossless encoding section 25 causes each acquired parameter regarding the encoding process as syntax elements of the H. 265/HEVC standards to be accumulated in the accumulation buffer 26 as part of header information of the encoded stream. In addition, as syntax elements of the encoded stream or as SEI (Supplemental Enhancement Information) which is additional information, the lossless encoding section 25 includes, in the encoded stream, the fisheye information input to the image encoding apparatus 10.

The intra-prediction section 41 has a configuration similar to that of the intra-prediction section in the first embodiment illustrated in FIG. 2 and is different from the first embodiment in terms of an intra-prediction mode table selected by the table selecting section.

In a case where an input image is a fisheye image, the block position computing section 411 computes the position of a processing target block relative to a fisheye center, and outputs, to the table selecting section 412, positional information representing the computed position.

In a case where an input image is a fisheye image, the table selecting section 412 outputs, to the prediction image generating section 413, an intra-prediction mode table for which a prediction mode is selected according to the position of a processing target block relative to a fisheye center on the basis of positional information. In addition, in a case where an input image is a normal image, the table selecting section 412 outputs a predetermined intra-prediction mode table to the prediction image generating section 413.

By using the reference image data read out from the frame memory 36 via the selecting section 37, the prediction image generating section 413 generates prediction image data for all the prediction modes represented in the intra-prediction mode table supplied from the table selecting section 412. In addition, the prediction image generating section 413 performs, for each prediction block size, generation of prediction image data for each prediction mode by setting a processing target block to a prediction block size. The prediction image generating section 413 outputs the generated prediction image data to the optimum mode deciding section 414.

The optimum mode deciding section 414 computes a cost function value by using the original image data supplied from the screen rearrangement buffer 21, and prediction image data for each prediction block size and for each prediction mode. In addition, the optimum mode deciding section 414 generates intra-prediction information having table information representing an optimum intra-prediction mode and an optimum size and an intra-prediction mode table selected in a case where an input image is a fisheye image while deciding a combination of an intra-prediction mode and a prediction block size that minimizes the cost function value, that is, that maximizes the compression rate, as an optimum intra-prediction mode, and an optimum prediction block size. The optimum mode deciding section 414 outputs, to the prediction selecting section 43, intra-prediction information, prediction image data generated in the optimum intra-prediction mode, and the cost function value in the case of the optimum intra-prediction mode and the optimum size.

<3-2. Operation by Image Encoding Apparatus>
<3-2-1. Regarding Intra-Prediction Table>

Because fisheye images have distortions toward the fisheye center, fisheye images have characteristics that prediction directions become dense in the circumferential direction as illustrated in FIG. 8 mentioned above. In addition, as the distance from the fisheye center increases, the degree of density increases. In view of this, in the second embodiment, an intra-prediction mode table (hereinafter, referred to as a "selection table") for which prediction modes are selected according to the direction of high density and the degree of density from prediction modes in a basic table is generated in advance, and intra-prediction is performed by use of a selection table according to the position of a processing target block. Thereby, intra-prediction is performed more efficiently than in a case where the basic table is used.

A selection table is generated according to the orientations of processing target blocks relative to the fisheye center, or according to the orientations, and the distances from the fisheye center to the processing target blocks.

FIG. 20 illustrates examples of an operation in a case where a selection table is generated on the basis of orientations of processing target blocks relative to a fisheye center. In a case where the position Pa of a processing target block is at an angle θ relative to the fisheye center Pg, the angle θ has a value represented by Formula (8) as mentioned above. In addition, the circumferential angle $θ_d$ is represented by Formula (13). Note that, in a case where θ>180°, the circumferential angle $θ_d$ is point-symmetric with respect to the fisheye center Pg.

$$θ_d=(θ±900) \quad (13)$$

The selection table is generated by selecting, from prediction modes in the basic table, an intra-prediction mode by setting the direction of the angle $θ_d$ as the direction of high density.

Figure 21:
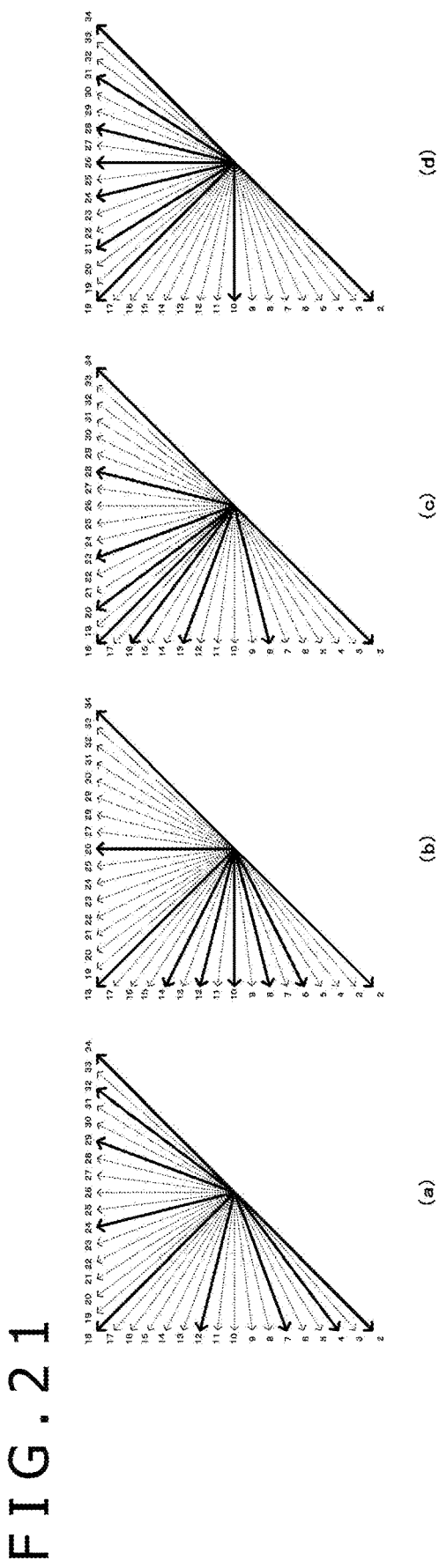
FIG. 21 depicts views illustrating an example of orientations of processing target blocks relative to the fisheye center, and prediction mode selection results.

FIG. 21 illustrates examples of orientations of processing target blocks relative to a fisheye center, and prediction mode selection results. Subfigure (a) in FIG. 21 illustrates an example of a case where the processing target block is at the position Pa1 (θ=135°) as illustrated in Subfigure (a) in FIG. 20. In this case, a prediction mode is selected by setting the directions of $θ_d$=450 and 225° as directions of high density, and direction predictions 2, 4, 7, 12, 18, 24, 29, 32, and 34 are selected, for example.

Subfigure (b) in FIG. 21 illustrates an example of a case where the processing target block is at the position Pa2 (θ=90°). In this case, a prediction mode is selected by setting the direction of $θ_d$=1800 as a direction of high density, and direction predictions 2, 6, 8, 10, 12, 14, 18, 26, and 34 are selected, for example.

Subfigure (c) in FIG. 21 illustrates a case where the processing target block is at the position Pa3 (=45°). In this case, a prediction mode is selected by setting the direction of $θ_d$=135° as a direction of high density, and direction predictions 2, 8, 13, 16, 18, 20, 23, 28, and 34 are selected.

Subfigure (d) in FIG. 21 illustrates a case where the processing target block is at the position Pa4 (θ=0°). In this case, a prediction mode is selected by setting the direction of $θ_d$=90° as a direction of high density, and direction predictions 2, 10, 18, 21, 24, 26, 28, 31, and 34 are selected, for example.

By selecting prediction modes with a circumferential direction based on the orientation of a processing target block relative to the fisheye center set as a direction of high density and generating a selection table in this manner, it becomes possible to perform intra-prediction efficiently as compared to a case where a reference table is used.

Next, a case where a selection table is generated on the basis of the orientations of processing target blocks relative to a fisheye center and the distances from the fisheye center to the processing target blocks will be described. As illustrated in FIG. 8 mentioned above, the density of prediction modes in the circumferential direction becomes higher as processing target blocks are farther apart from the center of the fisheye image. Accordingly, the intra-prediction section 41 performs intra-prediction by using a selection table for which prediction modes are selected such that the degree of density becomes higher as processing target blocks are farther apart from the center of the fisheye image.

FIG. 22 illustrates examples of an operation in a case where a selection table is generated on the basis of orientations of processing target blocks relative to a fisheye center and distances from the fisheye center. In a case where the position Pa of a processing target block is at the distance GA from the fisheye center Pg, the distance GA has a value represented by Formula (14).

[Math. 1]

$$GA = (x-x_g)^2 + (y-y_g)^2 \qquad (14)$$

A selection table is generated by selecting, from prediction modes in the basic table, an intra-prediction mode table such that the degree of density increases as the distance GA becomes longer by setting the direction of the angle $\theta_d$ as a direction of high density.

Figure 23:
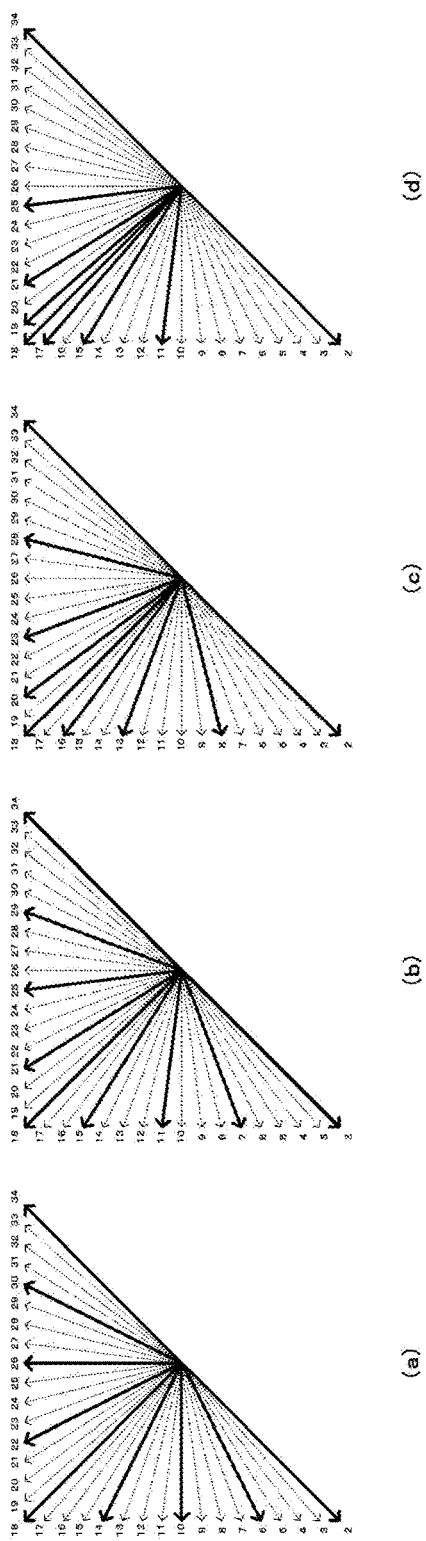
FIG. 23 depicts views illustrating an example of prediction mode selection results according to orientations of processing target blocks relative to a fisheye center, and distances from the fisheye center to the processing target blocks.

FIG. 23 illustrates examples of prediction mode selection results according to orientations of processing target blocks relative to a fisheye center and distances from the fisheye center to the processing target blocks. Note that, as illustrated in Subfigure (a) in FIG. 22, the distance GA from the fisheye center to the position Pa3-1 of a processing target block is defined as L1. In addition, the distance GA from the fisheye center to the positions Pa3-2, Pa3-3, and Pa3-4 of processing target blocks are defined as L2 (>L1), L3 (>L2) and L4 (>L3).

(a) in FIG. 23 illustrates a case where a processing target block is at the position Pa3-1 ($\theta$=45°, GA=L1). Because L1 is short in this case, prediction modes are selected at constant intervals, and direction predictions 2, 6, 10, 14, 18, 22, 26, 30, and 34 are selected, for example.

Subfigure (b) in FIG. 23 illustrates a case where a processing target block is at the position Pa3-2 (8=45°, GA=L2). In this case, prediction modes are selected such that the density becomes higher in the direction of $\theta_d$=135° and the degree of density becomes higher than in the case of the position Pa3-1, and direction predictions 2, 7, 11, 15, 18, 21, 25, 29, and 34 are selected, for example.

Subfigure (c) in FIG. 23 illustrates a case where a processing target block is at the position Pa3-3 (9=45°, GA=L3). In this case, prediction modes are selected such that the density becomes higher in the direction of $\theta_d$=1350 and the degree of density becomes higher than in the case of the position Pa3-2, and direction predictions 2, 8, 13, 16, 18, 20, 23, 28, and 34 are selected, for example.

Subfigure (d) in FIG. 23 illustrates a case where a processing target block is at the position Pa3-4 (6=45°, GA=L4). In this case, prediction modes are selected such that the density becomes higher in the direction of $\theta_d$=1350 and the degree of density becomes higher than in the case of the position Pa3-3, and direction predictions 2, 11, 15, 17, 18, 19, 21, 25, and 34 are selected, for example.

By selecting prediction modes such that the degree of density becomes higher for processing target blocks that are farther apart from the fisheye center with a circumferential direction based on the orientation of a processing target block relative to the fisheye center set as a direction of high density and generating a selection table in this manner, it becomes possible to perform intra-prediction efficiently as compared to a case where a reference table is used. In addition, it is possible to generate a selection table with prediction modes that are more suited for a fisheye image than a selection table that is generated on the basis of the orientations of processing target blocks relative to the fisheye center.

Meanwhile, in a case where prediction modes are selected from a basic table and a selection table is generated according to orientations relative to the fisheye center and distances from the fisheye center, the processing cost of intra-prediction undesirably increases if a selection table is generated according to the positions of processing target blocks on which intra-prediction is to be performed. In addition, in a case where a selection table is generated and stored in advance for each position, the processing cost can be reduced, but the memory capacity required for storing the selection tables increases undesirably. Accordingly, it is attempted to reduce the processing cost of intra-prediction and memory capacity required for the intra-prediction by splitting a fisheye image into areas, preparing a selection table in advance for each area, and using a selection table corresponding to an area to which a processing target block belongs.

The area split of a fisheye image is performed in the radial direction relative to the center of the fisheye image on the basis of correction factors, similarly to the first embodiment, for example. In addition, the number of split areas (also referred to as the number of layers) of a fisheye image is set according to changes in the correction factors in the radial direction from the center of the fisheye image, and for example, the number of layers is increased as the maximum value of the changes in the correction factors for a predetermined distance in the radial direction increases. In addition, because the degrees of distortion are the same at positions that are point-symmetric with respect to the center of a fisheye image, the fisheye image is split into areas in the circumferential direction by setting straight lines passing through the center of the fisheye image as the area boundaries. Note that, because distortions in the area including the center of the fisheye image are small, the area may not be split into areas in the circumferential direction, and as illustrated in Subfigure (a) in FIG. 21, and Subfigure (a) in FIG. 23, an intra-prediction mode table representing a predetermined plurality of prediction modes selected at constant intervals from a basic table may be used.

The split areas are given indices (table_idx) of corresponding tables, and it is made possible thereby to use selection tables with indices corresponding to pixel positions in a fisheye image according to which areas the pixel positions belong. In addition, because the degrees of distortions are the same at positions that are point-symmetric with respect to the center of a fisheye image, areas at positions that are point-symmetric with respect to the center of the fisheye image are given the same indices.

In addition, a selection table group including a selection table corresponding to each area may be provided for each fisheye lens used for generation of fisheye images. The selection table group for each fisheye lens may be stored in advance in the image encoding apparatus, or may be supplied to the image encoding apparatus along with fisheye information or the like.

<3-2-2. Regarding Encoding Process Operation>

Next, an encoding process operation will be described. The encoding process operation by the image encoding apparatus according to the second embodiment is similar to the operation by the image encoding apparatus according to the first embodiment illustrated in FIG. 14 and is different in terms of the intra-prediction process at Step ST2.

Figure 24:
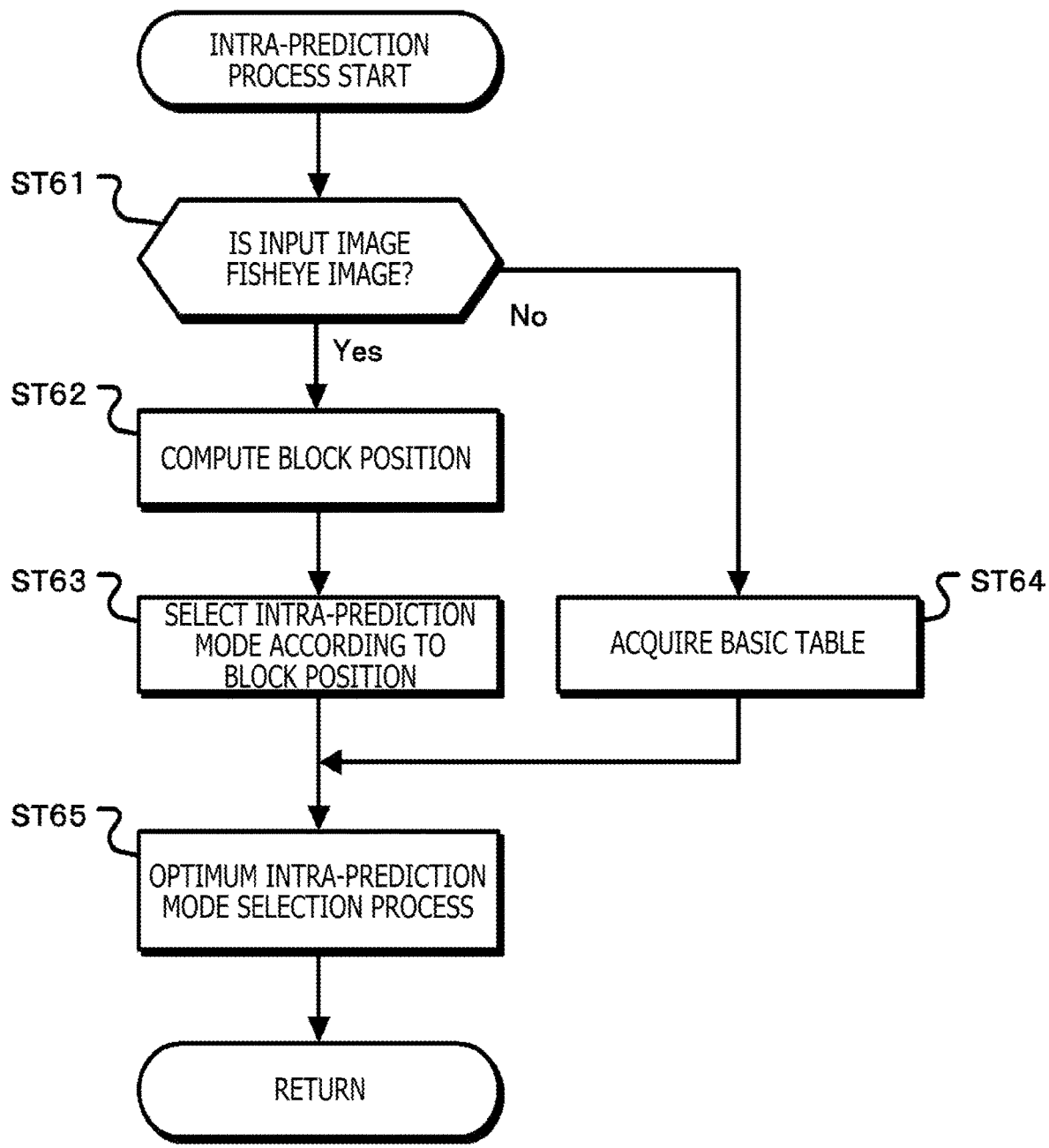
FIG. 24 is a flowchart illustrating an intra-prediction process.

FIG. 24 is a flowchart illustrating an intra-prediction process. At Step ST61, the intra-prediction section identifies whether the input image is a fisheye image. In a case where the intra-prediction section 41 of the image encoding apparatus 10 identifies on the basis of fisheye information that the input image is a fisheye image, the intra-prediction section 41 proceeds to Step ST62, and in a case where the intra-prediction section 41 identifies that the input image is not a fisheye image, the intra-prediction section 41 identifies that the input image is a normal image and proceeds to Step ST64.

At Step ST62, the intra-prediction section computes a block position. The intra-prediction section 41 computes the orientation of the processing target block relative to the fisheye center or the orientation and distance from the fisheye center to the processing target block and proceeds to Step ST63.

At Step ST63, the intra-prediction section acquires a selection table according to a block position. In a case where the orientation is computed at Step ST62, the intra-prediction section 41 acquires a selection table according to the orientation. In addition, in a case where the orientation and the distance are computed at Step ST62, the intra-prediction section 41 acquires a selection table according to the orientation and the distance. Note that, because distortions at positions adjacent to the fisheye center are small, a reference table may be selected as a selection table therefor. The intra-prediction section 41 acquires a selection table according to the position of a processing target block and proceeds to Step ST65.

At Step ST64, the intra-prediction section acquires a basic table. Because the input image is a normal image, the intra-prediction section 41 acquires the basic table and proceeds to Step ST65.

At Step ST65, the intra-prediction section performs an optimum intra-prediction mode selection process. The intra-prediction section 41 performs intra-prediction in a prediction mode represented in the selection table acquired at Step ST63 or the basic table acquired at Step ST64 by using the reference image data read out from the frame memory 36, and generates prediction image data. The intra-prediction section 41 computes a cost function value by using the generated prediction image data and original image data. Note that decoded image data having not been subjected to a filtering processed by the deblocking filter 34 or the like is used as the reference image data. The intra-prediction section 41 selects an optimum intra-prediction mode on the basis of the computed cost function values, and outputs, to the prediction selecting section 43, prediction image data generated by intra-prediction in the optimum intra-prediction mode, and its parameter and cost function value.

Note that, because the image encoding apparatus selects a prediction mode from a basic table and performs an encoding process in the manner mentioned above, even if an input image is a fisheye image, the image decoding apparatus can reproduce the fisheye image by performing intra-prediction in a prediction mode represented in an encoded stream and generating prediction image data, similarly to the case of normal images.

According to the second embodiment like this, because a prediction mode in direction prediction is used selectively in intra-prediction, it becomes possible to perform intra-prediction efficiently as compared to a case where all the prediction modes are used. Further, because, in a case where an input image is a fisheye image, prediction modes are selected according to distortions of the fisheye image, it becomes possible to enhance the encoding efficiency as compared to a case where prediction modes are selected without considering distortions of a fisheye image.

4. Application Examples

Next, application examples of the image processing apparatus according to the present technique will be described. The image processing apparatus according to the present technique can be applied to an image-capturing apparatus that captures moving images by use of a fisheye lens, for example. In this case, by providing the image encoding apparatus 10 to an image-capturing apparatus, fisheye images can be encoded efficiently, and an encoded stream can be recorded in a recording medium or output to external equipment. In addition, by providing the image decoding apparatus 50 to an image-capturing apparatus, an encoded stream can be decoded to record and reproduce a fisheye image. In addition, by mounting an image-capturing apparatus provided with the image encoding apparatus 10 on any type of moving body such as automobile, electric car, hybrid electric car, motorcycle, bicycle, personal transporter, airplane, drone, ship, robot, construction machine, or agricultural machine (tractor), for example, it becomes possible to record images of the entire surrounding environment of the moving body efficiently or transmit the images to external equipment. Further, by providing the image processing apparatus according to the present technique to portable electronic equipment having a function of capturing moving images by use of a fisheye lens, it becomes possible to reduce an amount of data when the fisheye images are recorded on a recording medium, as compared to conventional techniques. In addition, by providing the image processing apparatus to perform the decoding process to an image reproducing apparatus, it becomes possible to display an omnidirectional image on a head-mounted display or the like.

The series of processes explained in the specification can be executed by hardware or software, or by a composite configuration of hardware and software. In a case where processes by software are executed, a program on which the process sequence is recorded is installed on a memory of a computer incorporated in dedicated hardware to be executed. Alternatively, the program can be installed and executed on a general-purpose computer that can execute various types of process.

For example, the program can be recorded in advance on a hard disk, an SSD (Solid State Drive), or a ROM (Read Only Memory) as a recording medium. Alternatively, the program can be stored (recorded) in advance temporarily or permanently on a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, or a semiconductor memory card. Such a removable recording medium can be provided as so-called package software.

In addition, other than being installed onto a computer from a removable recording medium, the program may be transferred wirelessly or through cables from a download site to a computer via a network such as a LAN (Local Area Network) or the Internet. The computer can receive the program transferred in such a manner and install the program on a recording medium such as a built-in hard disk.

Note that advantages described in the present specification are illustrated merely as examples, and the advantages of the present technique are not limited to them. There may be additional advantages that are not described. In addition, the present technique should not be interpreted as being limited to the embodiments of the technique mentioned above. It is obvious that embodiments of this technique disclose the present technique in the form of illustration of examples and that those skilled in the art may conceive of corrections and substitutions of the embodiments within the scope not deviating from the gist of the present technique. That is, claims should be considered when the gist of the present technique is to be determined.

In addition, the image processing apparatus of the present technique can also adopt configurations like the ones mentioned below.

(1) An image processing apparatus including:
an intra-prediction section that performs intra-prediction by using an intra-prediction mode table according to a position of a processing target block in a fisheye image captured by use of a fisheye lens thereby to generate a prediction image.

(2) The image processing apparatus according to (1), in which
the intra-prediction mode table according to the position of the processing target block includes a table in which a predetermined plurality of prediction directions is varied according to the position of the processing target block relative to a fisheye center of the fisheye image.

(3) The image processing apparatus according to (2), in which
the intra-prediction mode table according to the position of the processing target block includes a table in which the prediction directions are varied on the basis of a correction factor for correcting a fisheye distortion generated at the position of the processing target block.

(4) The image processing apparatus according to (1), in which
the intra-prediction mode table according to the position of the processing target block includes a table that represents a prediction direction selected from a predetermined plurality of prediction directions according to the position of the processing target block relative to a fisheye center of the fisheye image.

(5) The image processing apparatus according to (4), in which
the intra-prediction mode table according to the position of the processing target block includes a table that represents a prediction direction selected from the predetermined plurality of prediction directions while a circumferential direction orthogonal to a direction of the processing target block relative to the fisheye center is set as a direction of high density.

(6) The image processing apparatus according to (4) or (5), in which
the intra-prediction mode table according to the position of the processing target block includes a table that represents a prediction direction selected from the predetermined plurality of prediction directions while a degree of density is increased as a distance from the fisheye center to the processing target block increases.

(7) The image processing apparatus according to any of (1) to (6), in which
the fisheye image is split into a plurality of areas in a radial direction and a circumferential direction by using a fisheye center of the fisheye image as a reference point, the intra-prediction mode table is provided for each area, and the intra-prediction section performs intra-prediction by using an intra-prediction mode table corresponding to an area including the processing target block.

(8) The image processing apparatus according to (7), in which
the same intra-prediction mode table is provided for areas that are point-symmetric with respect to the fisheye center as a target point.

(9) The image processing apparatus according to (7) or (8), in which
an intra-prediction mode table of an area including the fisheye center includes a table that represents a predetermined plurality of prediction directions.

(10) The image processing apparatus according to any of (7) to (9), in which
the number of split areas in the radial direction is set according to lens characteristics of the fisheye lens.

(11) The image processing apparatus according to (7) to (10), in which
area split intervals in the radial direction are set according to lens characteristics of the fisheye lens.

(12) The image processing apparatus according to any of (1) to (11), further including:
a lossless encoding section that includes fisheye information in an encoded stream of an input image in a case where the input image is a fisheye image.

(13) The image processing apparatus according to (12), in which
the fisheye information includes information representing at least that the input image is a fisheye image and where a fisheye center of the fisheye image is.

(14) The image processing apparatus according to (13), in which
the fisheye information includes information regarding the fisheye lens used for acquisition of the fisheye image.

(15) The image processing apparatus according to any of (1) to (11), further including:
a lossless decoding section that decodes an encoded stream of the fisheye image, in which
the lossless decoding section parses fisheye information and an optimum intra-prediction mode included in the encoded stream, and
the intra-prediction section generates a prediction image by using an intra-prediction mode table according to the position of the processing target block on the basis of the fisheye information and the optimum intra-prediction mode obtained by the lossless decoding section.

(16) The image processing apparatus according to (15), in which
the fisheye information includes information representing at least that the input image is a fisheye image and where a fisheye center of the fisheye image is, and
the intra-prediction section uses an intra-prediction mode table according to the position of the processing target block relative to the fisheye center of the fisheye image.

(17) The image processing apparatus according to (16), in which
the fisheye information includes information regarding the fisheye lens used for acquisition of the fisheye image, and
the intra-prediction section uses an intra-prediction mode table according to the information regarding the fisheye lens and the position of the processing target block.

INDUSTRIAL APPLICABILITY

According to the image processing apparatus and the image processing method of this technique, intra-prediction is performed by use of an intra-prediction mode table according to the position of a processing target block in a fisheye image captured with a fisheye lens, and a prediction image is generated. Because of this, an encoding or decoding process on an image on which distortions are generated can be performed efficiently. Accordingly, the image processing apparatus and the image processing method are suited for electronic equipment, mobile apparatuses, and the like that perform recording, reproduction, transmission, and the like of fisheye images.

REFERENCE SIGNS LIST

- 10: Image encoding apparatus
- 21, 68: Screen rearrangement buffer
- 22, 33, 65: Calculating section
- 23: Orthogonal transforming section
- 24: Quantizing section
- 25: Lossless encoding section
- 26: Accumulation buffer
- 27: Rate control section
- 31, 63: Inverse quantizing section
- 32, 64: Inverse orthogonal transforming section
- 34, 66: Deblocking filter
- 35, 67: SAO filter
- 36, 71: Frame memory
- 37, 72: Selecting section
- 41: Intra-prediction section
- 42: Inter-prediction section
- 43: Prediction selecting section
- 50: Image decoding apparatus
- 61: Accumulation buffer
- 62: Lossless decoding section
- 73: Intra-prediction section
- 74: Motion compensating section
- 411: Block position computing section
- 412: Table selecting section
- 413: Prediction image generating section
- 414: Optimum mode deciding section

The invention claimed is:

1. An image processing apparatus comprising:
an intra-prediction section that performs intra-prediction by using an intra-prediction mode table according to a position of a processing target block in a fisheye image captured by use of a fisheye lens thereby to generate a prediction image.

2. The image processing apparatus according to claim 1, wherein
the intra-prediction mode table according to the position of the processing target block includes a table in which a predetermined plurality of prediction directions is varied according to the position of the processing target block relative to a fisheye center of the fisheye image.

3. The image processing apparatus according to claim 2, wherein
the intra-prediction mode table according to the position of the processing target block includes a table in which the prediction directions are varied on a basis of a correction factor for correcting a fisheye distortion generated at the position of the processing target block.

4. The image processing apparatus according to claim 1, wherein
the intra-prediction mode table according to the position of the processing target block includes a table that represents a prediction direction selected from a predetermined plurality of prediction directions according to the position of the processing target block relative to a fisheye center of the fisheye image.

5. The image processing apparatus according to claim 4, wherein
the intra-prediction mode table according to the position of the processing target block includes a table that represents a prediction direction selected from the predetermined plurality of prediction directions while a circumferential direction orthogonal to a direction of the processing target block relative to the fisheye center is set as a direction of high density.

6. The image processing apparatus according to claim 4, wherein
the intra-prediction mode table according to the position of the processing target block includes a table that represents a prediction direction selected from the predetermined plurality of prediction directions while a degree of density is increased as a distance from the fisheye center to the processing target block increases.

7. The image processing apparatus according to claim 1, wherein
the fisheye image is split into a plurality of areas in a radial direction and a circumferential direction by using a fisheye center of the fisheye image as a reference point, the intra-prediction mode table is provided for each area, and
the intra-prediction section performs intra-prediction by using an intra-prediction mode table corresponding to an area including the processing target block.

8. The image processing apparatus according to claim 7, wherein
the same intra-prediction mode table is provided for areas that are point-symmetric with respect to the fisheye center as a target point.

9. The image processing apparatus according to claim 7, wherein
an intra-prediction mode table of an area including the fisheye center includes a table that represents a predetermined plurality of prediction directions.

10. The image processing apparatus according to claim 7, wherein
the number of split areas in the radial direction is set according to lens characteristics of the fisheye lens.

11. The image processing apparatus according to claim 7, wherein
area split intervals in the radial direction are set according to lens characteristics of the fisheye lens.

12. The image processing apparatus according to claim 1, further comprising:
a lossless encoding section that includes fisheye information in an encoded stream of an input image in a case where the input image is a fisheye image,
wherein the lossless encoding section is implemented by hardware via at least one processor.

13. The image processing apparatus according to claim 1, wherein
the fisheye information includes information representing at least that the input image is a fisheye image and where a fisheye center of the fisheye image is.

14. The image processing apparatus according to claim 13, wherein
the fisheye information includes information regarding the fisheye lens used for acquisition of the fisheye image.

15. The image processing apparatus according to claim 1, further comprising:

a lossless decoding section that decodes an encoded stream of the fisheye image, wherein the lossless decoding section parses fisheye information and an optimum intra-prediction mode included in the encoded stream, and the intra-prediction section generates a prediction image by using an intra-prediction mode table according to the position of the processing target block on a basis of the fisheye information and the optimum intra-prediction mode obtained by the lossless decoding section, wherein the lossless decoding section is implemented by hardware via at least one processor.

16. The image processing apparatus according to claim 15, wherein the fisheye information includes information representing at least that the input image is a fisheye image and where a fisheye center of the fisheye image is, and the intra-prediction section uses an intra-prediction mode table according to the position of the processing target block relative to the fisheye center of the fisheye image.

17. The image processing apparatus according to claim 16, wherein the fisheye information includes information regarding the fisheye lens used for acquisition of the fisheye image, and the intra-prediction section uses an intra-prediction mode table according to the information regarding the fisheye lens and the position of the processing target block.

18. An image processing method comprising:

performing intra-prediction by using an intra-prediction mode table according to a position of a processing target block in a fisheye image captured by use of a fisheye lens, thereby generating a prediction image by an intra-prediction section.

\* \* \* \* \*